(12) United States Patent
Jung et al.

(10) Patent No.: US 12,340,469 B2
(45) Date of Patent: Jun. 24, 2025

(54) METHOD OF DISPLAYING AUGMENTED REALITY AND ELECTRONIC DEVICE FOR PERFORMING SAME

(71) Applicant: Samsung Electronics Co., Ltd., Suwon-si (KR)

(72) Inventors: Jaewook Jung, Suwon-si (KR); Kihoon Kim, Suwon-si (KR); Soyoung Kim, Suwon-si (KR); Jonggyu Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/535,846

(22) Filed: Nov. 26, 2021

(65) Prior Publication Data
US 2022/0108536 A1    Apr. 7, 2022

Related U.S. Application Data

(63) Continuation of application No. PCT/KR2021/013395, filed on Sep. 29, 2021.

(30) Foreign Application Priority Data

Oct. 7, 2020    (KR) .................... 10-2020-0129464

(51) Int. Cl.
*G06T 19/00*    (2011.01)
*G06T 7/11*    (2017.01)
(Continued)

(52) U.S. Cl.
CPC .............. *G06T 19/006* (2013.01); *G06T 7/11* (2017.01); *G06T 7/70* (2017.01); *G06T 19/20* (2013.01);
(Continued)

(58) Field of Classification Search
CPC . G06T 19/006; G06T 7/11; G06T 7/20; G06T 2207/20021; G06T 2207/20101;
(Continued)

(56) References Cited

U.S. PATENT DOCUMENTS 8,947,458 B2    2/2015    Rye et al.
9,161,167 B2    10/2015    Aldana et al.
(Continued)

FOREIGN PATENT DOCUMENTS

CN    106302679 A    * 1/2017    ............. A63F 13/35
CN    107209386 B    * 2/2020    ........... G02B 27/017
(Continued)

OTHER PUBLICATIONS

International Search Report dated Jan. 5, 2022, issued in International Application No. PCT/KR2021/013395.
(Continued)

*Primary Examiner* — Chante E Harrison
(74) *Attorney, Agent, or Firm* — Jefferson IP Law, LLP

(57) ABSTRACT

An electronic device for displaying augmented reality and a method of displaying augmented reality content received from a server, on an image obtained with respect to a real space including a target object are provided. The method includes obtaining location information of the electronic device and field of view information of the electronic device, transmitting, to the server, the location information of the electronic device and the field of view information of the electronic device, receiving, from the server, the augmented reality content generated by the server based on the location information of the electronic device and the field of view information of the electronic device, and displaying the received augmented reality content on the image.

8 Claims, 13 Drawing Sheets

(51) Int. Cl.
  *G06T 7/70* (2017.01)
  *G06T 19/20* (2011.01)
  *G06V 20/20* (2022.01)
  *G06V 20/40* (2022.01)
  *H04L 67/131* (2022.01)
(52) U.S. Cl.
  CPC .............. *G06V 20/20* (2022.01); *G06V 20/42* (2022.01); *H04L 67/131* (2022.05); *G06T 2207/20021* (2013.01); *G06T 2207/20101* (2013.01); *G06T 2207/30221* (2013.01)
(58) Field of Classification Search
  CPC . G06T 2207/30196; G06T 2207/30221; G06T 2219/004; G06V 20/20; G06V 20/42; G06V 10/225; G06V 2201/07; H04L 67/131
  See application file for complete search history.

(56) References Cited

U.S. PATENT DOCUMENTS

| | | | |
|---|---|---|---|
| 9,654,818 B2 | 5/2017 | Kuncl et al. | |
| 10,282,882 B2 | 5/2019 | Sumner et al. | |
| 11,517,821 B2 | 12/2022 | Lee et al. | |
| 11,651,561 B2* | 5/2023 | Daniels | G06T 19/006 345/633 |
| 2014/0354688 A1 | 12/2014 | Min et al. | |
| 2018/0240220 A1 | 8/2018 | Katori et al. | |
| 2020/0074738 A1* | 3/2020 | Hare | G06T 7/70 |
| 2020/0223360 A1* | 7/2020 | Bruno | G06T 19/006 |
| 2021/0201029 A1* | 7/2021 | Ju | G06Q 20/3224 |
| 2021/0264643 A1 | 8/2021 | Joo et al. | |
| 2021/0368152 A1* | 11/2021 | Nishibe | G06F 3/011 |
| 2022/0075591 A1* | 3/2022 | Cardenas Gasca | G06K 7/1439 |
| 2022/0335661 A1* | 10/2022 | Spear | G06V 20/20 |
| 2023/0078483 A1* | 3/2023 | Berger | G10L 15/26 345/589 |
| 2023/0147759 A1* | 5/2023 | Steinbrücker | G06V 20/20 345/419 |
| 2023/0154121 A1* | 5/2023 | Assouline | G06T 7/62 345/419 |
| 2023/0222792 A1* | 7/2023 | Badr | G06T 11/00 348/169 |

FOREIGN PATENT DOCUMENTS

| | | | | |
|---|---|---|---|---|
| CN | 112639891 A | * | 4/2021 | ......... G06K 9/00671 |
| CN | 114450967 A | * | 5/2022 | ............ G06T 11/00 |
| CN | 115904066 A | * | 4/2023 | |
| JP | 2019-164620 A | | 9/2019 | |
| KR | 10-1126449 B1 | | 3/2012 | |
| KR | 10-2012-0075565 A | | 7/2012 | |
| KR | 10-2014-0141319 A | | 12/2014 | |
| KR | 10-1660089 B1 | | 9/2016 | |
| KR | 10-2085440 B1 | | 3/2020 | |
| KR | 10-2021-0106797 A | | 8/2021 | |
| WO | WO-2022131465 A1 | * | 6/2022 | ............ G06T 11/00 |
| WO | WO-2023031155 A1 | * | 3/2023 | |

OTHER PUBLICATIONS

Yujin Jeong, Report on AWE 2019—Potential of a Point, Facebook Twitter Jul. 12, 2019, https://www.naverlabs.com/storyDetail/137.
Younis Ayman et al., Latency-aware Hybrid Edge Cloud Famework for Mobile Augmented Reality Applications, 2020 17th Annual IEEE International Conference on Sensing, Communication and Networking (SECON), IEEE, Jun. 22, 2020.
Ochiai et al., Information presentation and search method in AR service using location information, NTT Docomo Technical Journal, Jan. 1, 2011.
European Search Report dated Feb. 2, 2024, issued in European Application No. 21877911.4.
Korean Office Action dated Mar. 18, 2025, issued in Korean Application No. 10-2020-0129464.

* cited by examiner

METHOD OF DISPLAYING AUGMENTED REALITY AND ELECTRONIC DEVICE FOR PERFORMING SAME

CROSS-REFERENCE TO RELATED APPLICATION(S)

This application is a continuation application, claiming priority under § 365(c), of an International application No. PCT/KR2021/013395, filed on Sep. 29, 2021, which is based on and claims the benefit of a Korean patent application number 10-2020-0129464, filed on Oct. 7, 2020, in the Korean Intellectual Property Office, the disclosure of which is incorporated by reference herein in its entirety.

TECHNICAL FIELD

The disclosure relates to a method of displaying an augmented reality, and an electronic device for displaying an augmented reality.

BACKGROUND ART

Augmented reality denotes a technology for providing, to a user, a virtual screen providing additional information by synthesizing and combining a virtual object or thing, based on the real world.

Augmented reality technology is being applied in various ways to remote medical diagnosis, broadcasting, location-based services, mobile games, mobile solution industries, education fields, and the like.

A user terminal may realize augmented reality by directly generating and rendering augmented reality content. However, there is a limit to generating the augmented reality content by the user terminal due to a limitation on computing performance of the user terminal and power consumption generated when the augmented reality content is rendered.

Recently, with the development of network technology, cloud-based augmented reality technology, wherein the user terminal receives and outputs data obtained by generating and rendering, by a server having stronger computing performance, the augmented reality content, is receiving attention. In other words, the user terminal receives, from the server, the augmented reality content corresponding to location information and direction information of the user terminal, which have been transmitted to the server, and displays the augmented reality content.

However, the cloud-based augmented reality technology may be unable to display the augmented reality content according to a location of a target object when the target object where the augmented reality content is to be displayed moves quickly or the user terminal moves quickly, due to a delay time generated when data is transmitted and received between the user terminal and the server. Accordingly, the cloud-based augmented reality technology of the related art may provide unnatural augmented reality content to the user.

Therefore, a need exists for an electronic device for displaying natural augmented reality content regardless of a delay time generated when data is transmitted and received between a user terminal and a server, and a method of displaying augmented reality content by using the electronic device.

The above information is presented as background information only to assist with an understanding of the disclosure. No determination has been made, and no assertion is made, as to whether any of the above might be applicable as prior art with regard to the disclosure.

DESCRIPTION OF EMBODIMENTS

Technical Problem

Aspects of the disclosure are to address at least the above-mentioned problems and/or disadvantages and to provide at least the advantages described below. Accordingly, an aspect of the disclosure is to provide an electronic device for displaying natural augmented reality content regardless of a delay time generated when data is transmitted and received between a user terminal and a server, and a method of displaying augmented reality content by using the electronic device.

Another aspect of the disclosure is to provide a server for providing augmented reality content to an electronic device such that the electronic device provides natural augmented reality regardless of a delay time, and a method of providing augmented reality content to the electronic device by using the server.

Additional aspects will be set forth in part in the description which follows and, in part, will be apparent from the description, or may be learned by practice of the presented embodiments.

Technical Solution to Problem

In accordance with an aspect of the disclosure, a method, performed by an electronic device, of displaying augmented reality content received from a server, on an image obtained by using a camera with respect to a real space including a target object, is provided. The method includes obtaining location information of the electronic device and field of view information of the electronic device, transmitting, to the server, the location information of the electronic device and the field of view information of the electronic device, receiving, from the server, the augmented reality content generated by the server based on the location information of the electronic device and the field of view information of the electronic device, and displaying the received augmented reality content on the image, wherein the displaying of the augmented reality content on the image includes identifying the target object from the image to identify target object location information regarding a location of the target object in the image, identifying, from the augmented reality content, first augmented reality location information about a location where the augmented reality content is to be displayed on a display of the electronic device, obtaining second augmented reality location information by comparing the target object location information with the first augmented reality location information, and displaying the augmented reality content on the image, based on the second augmented reality location information.

The displaying of the augmented reality content on the image further includes identifying the target object from each of a plurality of images obtained by using the camera to identify a moving speed of the target object on the plurality of images, comparing the target object location information identified according to the moving speed of the target object with the first augmented reality location information, and changing the first augmented reality location information to the second augmented reality location information, based on a result of the comparing.

The identifying of the target object location information includes identifying the target object from each of a plurality of images obtained by using the camera to accumulate and obtain the target object location information from each of the plurality of images, and changing the first augmented reality location information to the second augmented reality location information, based on a result of comparing the obtained target object location information with the first augmented reality location information.

The generating of the second augmented reality location information includes changing the first augmented reality location information to the second augmented reality location information, based on a data transmission/reception delay time between the electronic device and the server.

The identifying of the target object location information includes detecting movement of the electronic device to detect a moving direction and moving speed of the target object on the image, comparing the target object location information identified according to the moving speed of the target object with the first augmented reality location information, and changing the first augmented reality location information to the second augmented reality location information, based on a result of the comparing.

The displaying of the augmented reality content on the image further includes identifying at least one landmark from the image, segmenting the image into a plurality of grids, based on the at least one landmark, comparing the target object location information with the first augmented reality location information, based on the plurality of grids, and changing the first augmented reality location information to the second augmented reality location information, based on a result of the comparing.

The comparing of the target object location information with the first augmented reality location information includes detecting a moving direction and moving speed of the target object on the image, based on the plurality of grids, comparing the target object location information identified according to the moving speed of the target object with the first augmented reality location information, and changing the first augmented reality location information to the second augmented reality location information, based on a result of the comparing.

The transmitting of the location information of the electronic device and the field of view information of the electronic device includes identifying the target object from the image, and transmitting, to the server, the image and information about the identified target object, and the receiving of the augmented reality content includes receiving the augmented reality content generated based on the information about the target object transmitted to the server.

The identifying of the target object from the image includes receiving a user input of specifying the target object where the augmented reality content is to be obtained, and identifying the target object specified based on the user input, and the receiving of the augmented reality content from the server includes receiving the augmented reality content generated based on information about the specified target object.

The transmitting of the location information of the electronic device and the field of view information of the electronic device includes receiving a user input of selecting a type of the augmented reality content, and transmitting, to the server, information about the selected type of the augmented reality content, and the receiving of the augmented reality content includes receiving the augmented reality content generated to correspond to the selected type of the augmented reality content.

In accordance with another aspect of the disclosure, a method, performed by a server, of generating augmented reality content to be displayed on an image obtained by an electronic device by using a camera with respect to a real space including a target object, is provided. The method includes receiving, from the electronic device, location information of the electronic device and field of view information of the electronic device, identifying a location of the electronic device in a virtual 3-dimensional space, based on the location information of the electronic device, matching a field of view of the electronic device in the real space and a field of view of the electronic device in the virtual 3-dimensional space, based on the field of view information of the electronic device, generating augmented reality content corresponding to the target object, based on the location of the electronic device in the virtual 3-dimensional space and the field of view of the electronic device in the virtual 3-dimensional space, and transmitting the augmented reality content to the electronic device.

The generating of the augmented reality content includes matching the real space and the virtual 3-dimensional space, obtaining first location information of the target object in the real space, obtaining second location information of the target object in the virtual 3-dimensional space, based on the first location information, obtaining first augmented reality (AR) location information about where the augmented reality content is to be located, based on the second location information, and generating the augmented reality content including the first augmented reality location information.

The receiving of the field of view information of the electronic device includes receiving the image from the electronic device, and the matching of the field of view of the electronic device in the real space and the field of view of the electronic device in the virtual 3-dimensional space includes identifying at least one landmark from the image, segmenting the image into a plurality of first grids, based on the at least one landmark, segmenting the virtual 3-dimensional space into a plurality of second grids, based on the at least one landmark, matching the plurality of first grids and the plurality of second grids, based on the at least one landmark, obtaining first augmented reality location information about where the augmented reality content is to be located, based on the plurality of second grids, and generating the augmented reality content including the first augmented reality location information.

The obtaining of the first augmented reality location information includes obtaining first location information of the target object in the real space, obtaining second location information of the target object in the virtual 3-dimensional space, based on the first location information, and obtaining the first augmented reality location information on the plurality of second grids, based on the second location information.

The obtaining of the first location information includes identifying the target object from the image, and obtaining the first location information of the target object, based on the plurality of first grids.

The receiving of the field of view information of the electronic device includes receiving the image from the electronic device, and the generating of the augmented reality content includes identifying the target object from the image, detecting a moving direction and moving speed of the identified target object, and obtaining first augmented reality location information about where the augmented reality content is to be located, based on the moving direction and moving speed of the target object.

The generating of the augmented reality content includes obtaining first augmented reality location information about where the augmented reality content is to be located, based on a data transmission/reception delay time between the electronic device and the server, and generating the augmented reality content including the first augmented reality location information.

The receiving of the field of view information of the electronic device includes receiving, from the electronic device, the image and information about the target object, and the generating of the augmented reality content includes generating the augmented reality content, based on the received information about the target object.

The receiving of the information about the target object includes receiving the information about the target object specified via a user input from the electronic device, and the generating of the augmented reality content includes generating the augmented reality content, based on the information about the specified target object.

The receiving of the field of view information of the electronic device includes receiving, from the electronic device, information about a type of augmented reality content selected via a user input, and the generating of the augmented reality content includes generating the augmented reality content corresponding to the received type of augmented reality content.

According to another embodiment of the disclosure, a computer-readable recording medium has recorded thereon a program for executing, on a computer, at least one embodiment of the disclosure of the method.

According to another embodiment of the disclosure, an application stored in a recording medium executes at least one function among embodiments of the disclosure of the method.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE OF DISCLOSURE

Figure 1:
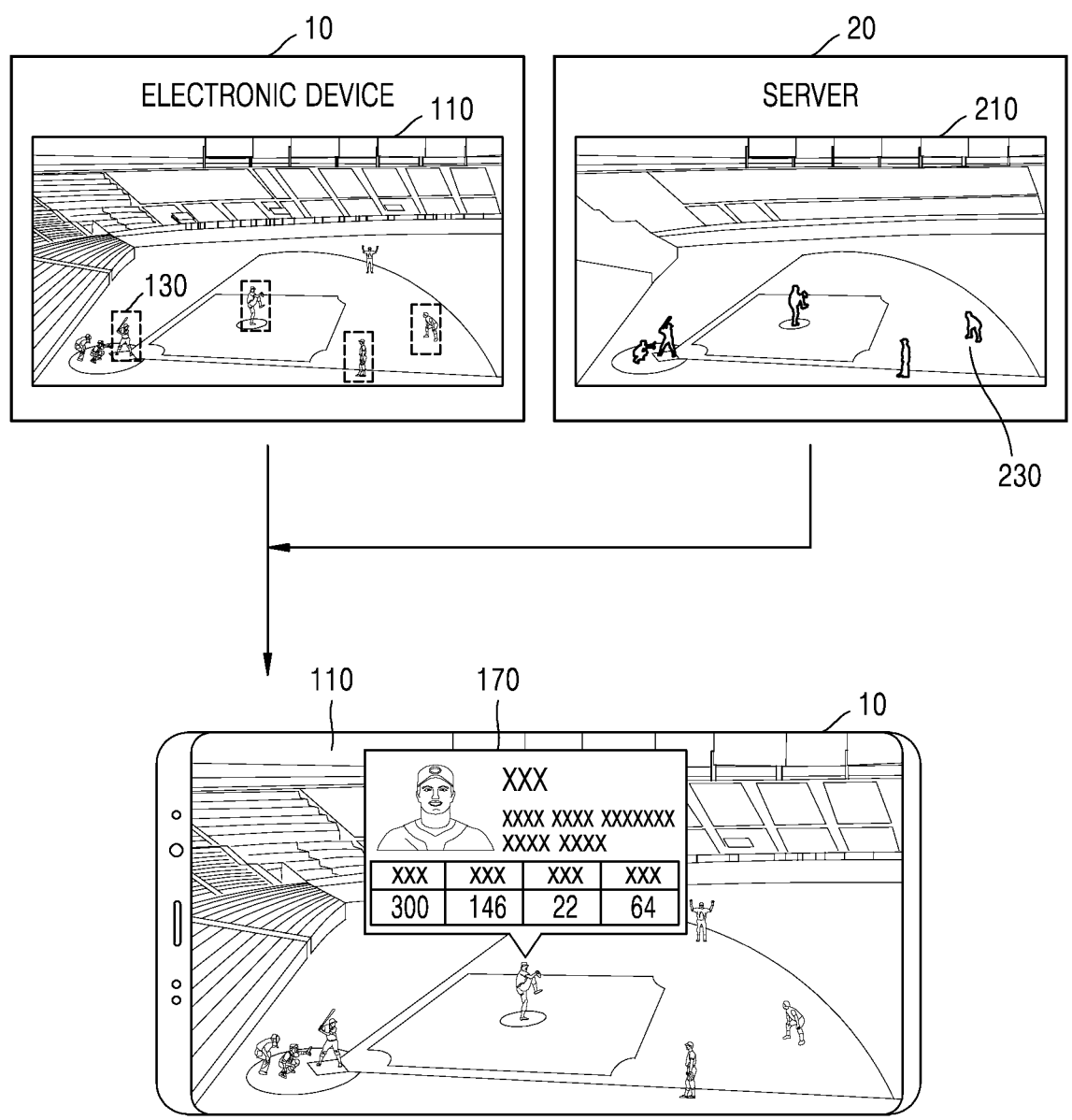
FIG. 1 is a diagram illustrating a method, performed by an electronic device, of displaying augmented reality content received from a server according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise.

In the disclosure, the expression "at least one of a, b, or c" may refer to "a", "b", "c", "a and b", "a and c", "b and c", "all of a, b, and c", or a modification thereof.

The specification describes the principle of the disclosure and discloses embodiments of the disclosure to clarify the scope of the disclosure and to allow those of ordinary skill in the art to carry out the disclosure. Disclosed embodiments of the disclosure may be implemented in various forms.

Throughout the specification, like reference numerals denote like elements. The specification does not describe all elements of the embodiments of the disclosure, and generic content in the technical field of the disclosure or redundant content of the embodiments of the disclosure is omitted. The term "part" or "portion" used in the specification may be implemented by software or hardware, and according to embodiments of the disclosure, a plurality of "parts" or "portions" may be implemented as one unit or element, or alternatively, one "part" or "portion" may include a plurality of units or elements. Hereinafter, operation principles and embodiments of the disclosure will be described with reference to accompanying drawings.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. In addition, for example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing. Terms, such as "mechanism", "element", "means", and "configuration" may be used widely and are not limited as mechanical and physical configurations.

Throughout the specification, when a part is "connected" to another part, the part may not only be "directly connected" to the other part, but may also be "electrically connected" to the other part with another element in between. In addition, when a part "includes" a certain element, the part may further include another element instead of excluding the other element, unless otherwise stated.

In addition, a connection line or a connection member between components shown in drawings is merely a functional connection and/or a physical or circuit connection. In an actual device, connections between components may be represented by various functional connections, physical connections, or circuit connections that are replaceable or added.

Further, the terms including ordinal numbers, such as "first", "second", and the like used in the specification may be used to describe various components, but the components should not be limited by the terms. The above terms may be used only to distinguish one component from another.

Hereinafter, embodiments of the disclosure will be described in detail with reference to accompanying drawings.

FIG. 1 is a diagram illustrating a method, performed by an electronic device, of displaying augmented reality content received from a server according to an embodiment of the disclosure.

Referring to FIG. 1, an electronic device 10 may provide an augmented reality content 170 to a user by using data received from a server 20. For example, the electronic device 10 may display the augmented reality content 170 received from the server 20 on an image 110 obtained with respect to a real space including a target object.

According to an embodiment of the disclosure, the electronic device 10 may include an operation apparatus, such as a mobile device (for example, a smartphone or a tablet personal computer (PC)) or a general-purpose computer (a PC), capable of transmitting and receiving data to and from the server 20 via a network. In addition, the electronic device 10 may include an operation apparatus including an artificial intelligence model, such as a mobile device (for example, a smartphone or a tablet PC), or a general-purpose computer (a PC).

The electronic device 10 may receive a user input. For example, the electronic device 10 may receive a user input of selecting a type of the augmented reality content 170. As another example, the electronic device 10 may receive a user input of specifying a target object 130.

The target object 130 denotes a target object of the augmented reality content 170 to be provided to the user by the electronic device 10. For example, the target object 130 may be a dynamic target object, such as an athlete who is playing a game, or a fixed target object, such as a building.

The augmented reality content 170 denotes content overlapped on an image reflecting a real space such that the user may experience augmented reality. Examples of the augmented reality content 170 may include information about an athlete who is playing a game, information about a performer, information about a piece being performed, and information about an exhibition work.

The electronic device 10 may display the augmented reality content 170, based on location information of the electronic device 10 and field of view information of the electronic device 10. The electronic device 10 may display the augmented reality content 170 at a location corresponding to the target object 130 on the image reflecting the real space.

The field of view information of the electronic device 10 denotes information about a direction of the electronic device 10 facing the real space for displaying the augmented reality content 170 by the electronic device 10.

According to an embodiment of the disclosure, the field of view information of the electronic device 10 may be obtained from a location or operation sensor, such as a gyro sensor of the electronic device 10.

According to an embodiment of the disclosure, the field of view information of the electronic device 10 may be obtained by a field of view on an image obtained by a camera of the electronic device 10.

According to an embodiment of the disclosure, the field of view information of the electronic device 10 may be obtained by comparing images obtained by the camera of the electronic device 10.

The location information of the electronic device 10 denotes information indicating where the electronic device 10 is located.

According to an embodiment of the disclosure, the location information of the electronic device 10 may be obtained by a location sensor of the electronic device 10, such as a global positioning system (GPS).

According to an embodiment of the disclosure, the location information of the electronic device 10 may be obtained via a positioning technology using a beacon.

According to an embodiment of the disclosure, the location information of the electronic device 10 may be obtained by identifying, by the electronic device 10, a seat number or quick response (QR) code of a space where data about a structure, such as a stadium, a theater, or an exhibition hall, is pre-obtained.

The electronic device 10 may transmit the location information and field of view information to the server 20. The electronic device 10 may also transmit, to the server 20, information about the target object 130 identified from the image 110. The electronic device 10 may also transmit, to the server 20, information about the type of augmented reality content 170 selected by the user.

The server 20 may transmit or receive data to or from the electronic device 10. The server 20 may store received data in a database (DB). In addition, the server 20 may perform various operations on the received data. For example, the server 20 may generate the augmented reality content 170 related to the target object 130 included in the image 110 obtained by the electronic device 10, and transmit the augmented reality content 170 to the electronic device 10. The electronic device 10 may display the augmented reality content 170, based on location information (hereinafter, augmented reality (AR) location information) where the augmented reality content 170 is to be displayed, the AR location information being received from the server 20.

According to an embodiment of the disclosure, the server 20 may obtain the location information of the electronic device 10 and the field of view information of the electronic device 10 to generate the augmented reality content 170. For example, the server 20 may receive, from the electronic device 10, the location information and field of view information of the electronic device 10. As another example, the server 20 may obtain the location information of the electronic device 10 by using a beacon provided in a pre-set place.

The server 20 may generate the augmented reality content 170 for the target object 130 included in the image 110 obtained by the electronic device 10, based on the location information and field of view information of the electronic device 10.

According to an embodiment of the disclosure, the server 20 may identify the target object 130 and a location of the target object 130 on the image 110, based on the location information and field of view information of the electronic device 10.

According to an embodiment of the disclosure, the server 20 may identify the location of the electronic device 10 and a direction in which the electronic device 10 is facing, on the real space where the data about the structure is pre-obtained, based on the location information and field of view information of the electronic device 10. The server 20 may accurately identify the location of the electronic device 10 and the direction in which the electronic device 10 is facing in the real space, by applying the location information and field of view information of the electronic device 10 to the data about the structure, which is stored in the DB. The server 20 may identify a location of the target object 130 on the image 110, based on the location of the electronic device 10 and the direction in which the electronic device 10 is facing.

According to an embodiment of the disclosure, the server 20 may generate a virtual 3-dimensional (3D) space 210 and match the virtual 3D space 210 to the real space, based on the location information and field of view information of the electronic device 10, thereby identifying a location of the electronic device 10 and a direction in which the electronic device 10 is facing on the virtual 3D space 210 matched to the real space. The server 20 may identify the location of the target object 130 on the image 110 from a target object 230 of the virtual 3D space 210, based on the location of the electronic device 10 and the direction in which the electronic device 10 is facing.

According to an embodiment of the disclosure, the server 20 may identify the location of the target object 130 on the image 110, based on a location of the target object in the real space. For example, the server 20 may identify the location of the target object in the real space by using a sensor attached to the target object in the real space, thereby obtaining the location of the target object 230 on the virtual 3D space 210 and identifying the location of the target object 130 on the image 110.

According to an embodiment of the disclosure, the server 20 may generate the augmented reality content 170 including information about the identified target object 230 in the real space. For example, the server 20 may identify an athlete in a stadium and generate the augmented reality content 170 including information about the athlete. As another example, the server 20 may identify a performer in a theater and props on a stage, and generate the augmented reality content 170 including information about the performer and props on the stage.

According to an embodiment of the disclosure, the server 20 may identify a location of the augmented reality content 170 displayed on the electronic device 10, based on the location of the target object 130 displayed on the electronic device 10. For example, the server 20 may generate the AR location information such that the augmented reality content 170 is displayed near the location of the target object 130.

The server 20 may transmit the augmented reality content 170 to the electronic device 10. Moreover, the server 20 may also transmit the AR location information to the electronic device 10.

The electronic device 10 may display, based on the AR location information received from the server 20, the augmented reality content 170 received from the server 20 on the image 110 obtained with respect to the real space.

According to an embodiment of the disclosure, the electronic device 10 may display the augmented reality content 170, based on an error of the location of the augmented reality content 170, which is generated due to a delay time while data is transmitted and received between the electronic device 10 and the server 20.

According to an embodiment of the disclosure, the electronic device 10 may identify a location where the augmented reality content 170 is to be displayed in the image 110, based on a result of comparing the AR location information with the location information of the identified target object 130.

For example, the electronic device 10 may obtain a plurality of images including the target object 130 and identify the target object 130 from each of the plurality of images, thereby accumulating and obtaining pieces of location information of the target object 130 on the image 110. The electronic device 10 may identify the location where the augmented reality content 170 is to be displayed, based on a result of comparing the AR location information with the pieces of location information of the target object 130.

As another example, the electronic device 10 may identify the target object 130 from each of the plurality of images to identify a moving speed and moving direction of the target object 130 on the plurality of images, and identify the location where the augmented reality content 170 is to be displayed by comparing the AR location information with the location information of the target object 130 identified according to the moving speed and moving direction of the target object 130.

As another example, the electronic device 10 may identify the location where the augmented reality content 170 is to be displayed by measuring the delay time while the data is transmitted and received between the electronic device 10 and the server 20 and performing a calculation by using, as parameters, the measured delay time and the moving speed of the target object 130.

The electronic device 10 may display the augmented reality content 170 on the image 110 by using a result of the identification.

Meanwhile, at least one of the electronic device 10 or the server 20 may use an artificial intelligence (AI) technology to identify a target object or to generate and display augmented reality content. For example, the electronic device 10 may apply the image 110 to an AI model, and identify the target object 130 from the image 110 or identify the moving direction and moving speed of the target object 130, by using a result output from the AI model. As another example, the server 20 may apply the location information and field of view information of the electronic device 10 received from the electronic device 10 to an AI model, match the real space and the virtual 3D space 210 by using a result output from the AI model, and identify the location of the electronic device 10 and the direction in which the electronic device 10 is facing on the virtual 3D space 210.

A function related to AI according to the disclosure operates via a processor and a memory. The processor may be configured as one or more processors. In this case, the one or more processors may be a general-purpose processor, such as a central processing unit (CPU), an application processor (AP), or a digital signal processor (DSP), a dedicated graphics processor, such as a graphical processing unit (GPU) or a vision processing unit (VPU), or a dedicated AI processor, such as a neural processing unit (NPU). The one or more processors may control input data to be processed according to predefined operation rules or an AI model stored in the memory. Alternatively, when the one or more processors are a dedicated AI processor, the dedicated AI processor may be designed with a hardware structure specialized for processing a specific AI model.

The predefined operation rules or AI model may be generated via a training process. This means that the predefined operation rules or AI model set to perform desired characteristics (or purposes) are generated by training a basic AI model with a learning algorithm that utilizes a large number of training data. The training process may be performed by a device for performing AI or a separate server and/or system. Examples of the learning algorithm may include supervised learning, unsupervised learning, semi-supervised learning, and reinforcement learning, but are not limited thereto.

The AI model may include a plurality of neural network layers. Each of the neural network layers includes a plurality of weight values, and performs a neural network arithmetic operation via an arithmetic operation between an arithmetic operation result of a previous layer and the plurality of weight values. A plurality of weight values in each of the neural network layers may be optimized by a result of training the AI model. For example, the plurality of weight values may be updated to reduce or minimize a loss or cost value obtained by the AI model during the training process. An artificial neural network may include a deep neural network (DNN) and may be, for example, a convolutional neural network (CNN), a DNN, a recurrent neural network (RNN), a restricted Boltzmann machine (RBM), a deep belief network (DBN), a bidirectional recurrent DNN (BRDNN), or deep Q-networks (DQN) but is not limited thereto.

According to an embodiment of the disclosure, the AI model may be included in the server 20. The electronic device 10 may transmit data obtained by the electronic device 10 to the server 20. The server 20 may apply the data received from the electronic device 10 to the AI model, and transmit data output from the AI model to the electronic device 10.

According to an embodiment of the disclosure, the AI model may be included in the electronic device 10. The electronic device 10 may store, in an internal memory, and use data for configuring the AI model. For example, the electronic device 10 may receive, from the server 20, the data for configuring the AI model, store the AI model in the internal memory, and use the AI model. In addition, the electronic device 10 may receive, from the server 20, data for refining the AI model.

The AI model may be generated by learning a plurality of pieces of text data and image data input as training data, according to a certain standard. The AI model may generate result data by performing a trained function in response to data input from the electronic device 10, and output the result data.

The AI model may include a plurality of AI models trained to perform at least one function.

Figure 2:
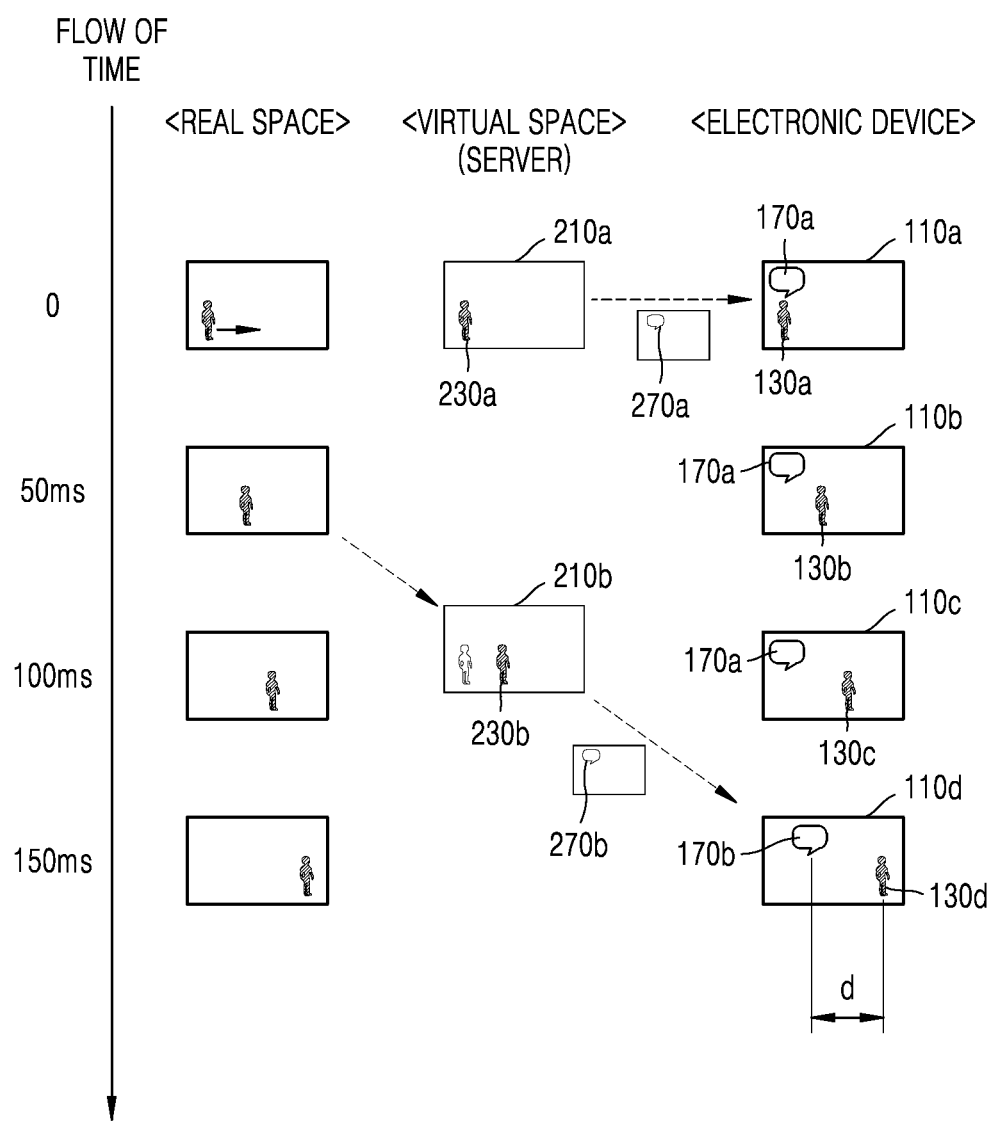
FIG. 2 is a diagram illustrating a problem that occurs when an electronic device displays augmented reality content received from a server according to the related art.

FIG. 2 is a diagram illustrating a problem that occurs when an electronic device displays augmented reality content received from a server according to the related art.

Referring to FIG. 2, the augmented reality content 170 is unable to be displayed according to the location of the target object 130 when the target object 130 on the image 110 moves to the right, during a delay time that occurs while data is transmitted and received between the electronic device 10 and the server 20, according to the related art. In other words, the augmented reality content 170 is displayed while being spaced apart from the target object 130 by a distance d, due to the delay time.

More particularly, at 0 ms, because a location of a target object in a real space, a location of a target object 230*a* on a virtual 3D space 210*a* generated by the server 20, and a location of a target object 130*a* in an image 110*a* displayed on the electronic device 10 are matched, it is determined that the electronic device 10 displays augmented reality content 170*a* according to the location of the target object 130*a*, by using augmented reality content 270*a* received from the server 20.

At 50 ms, the target object 230*b* in the real space and a target object 130*b* in an image 110*b* displayed on the electronic device 10 have moved to the right compared to the target object at 0 ms. Because the electronic device 10 receives and displays augmented reality content generated by the server 20, the electronic device 10 continuously displays the augmented reality content 170*a* that is previously received before augmented reality content is newly received from the server 20. Accordingly, the augmented reality content 170*a* is unable to be displayed at a location corresponding to the target object 130*b*.

The server 20 generates, on the virtual 3D space 210*a*, augmented reality content 270*b* at a location corresponding to the target object 230*b* in the real space and the target object 130*b* in the image 110*b* displayed on the electronic device 10 at 50 ms, and transmits the augmented reality content 270*b* to the electronic device 10.

At 100 ms and 150 ms, the target object 230*b* in the real space and target objects 130*c* and 130*d* on images 110*c* and 110*d* displayed on the electronic device 10 have further moved to the right. Accordingly, the electronic device 10 is unable to display augmented virtual reality 170*b* at a location corresponding to the target object 130*d*, by using the augmented reality content 270*b* received from the server 20.

Thus, augmented reality content according to the related art is unable to be displayed at a location corresponding to a target object due to a delay time generated when data is transmitted and received between the electronic device 10 and the server 20, and unnatural augmented reality content is provided to a user.

Accordingly, the electronic device 10 needs to adjust a location where the augmented reality content 170 is not be displayed.

Figure 3:
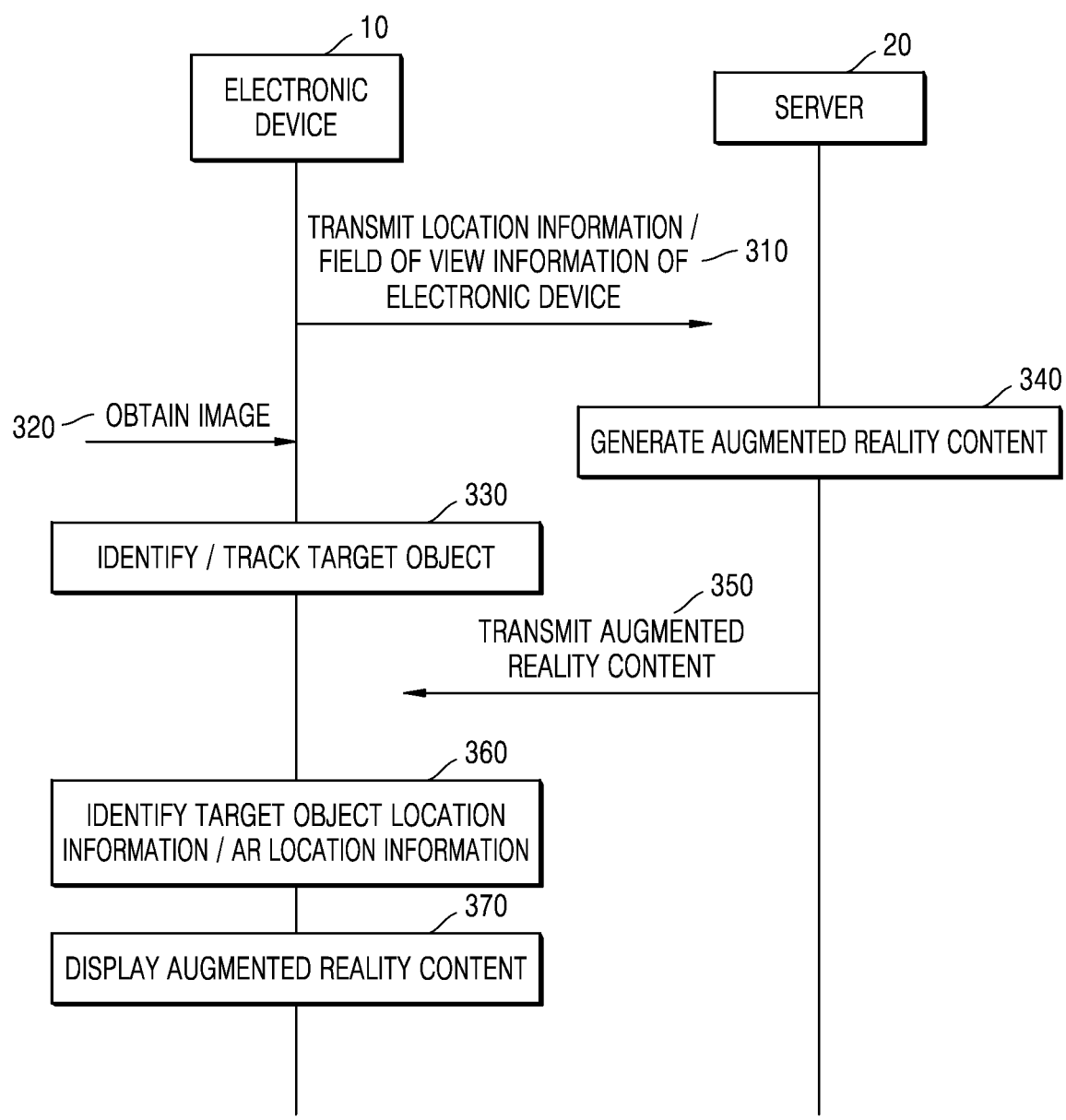
FIG. 3 is a flowchart of a method, performed by an electronic device and a server, of generating and displaying augmented reality content according to an embodiment of the disclosure.

FIG. 3 is a flowchart of a method, performed by an electronic device and a server, of generating and displaying augmented reality content according to an embodiment of the disclosure.

Referring to FIG. 3, in operation 310, the electronic device 10 may transmit, to the server 20, location information and field of view information of the electronic device 10. For example, the electronic device 10 may transmit, to the server 20, the location information and field of view information of the electronic device 10 in a real space, such as a stadium, a theater, or an exhibition hall.

Here, the electronic device 10 may also transmit, to the server 20, information about the target object 130 identified from the image 110. The electronic device 10 may also transmit, to the server 20, information about a type of augmented reality content 170 selected by a user. The electronic device 10 may measure a delay time that is generated when transmitting and receiving data to and from the server 20.

According to an embodiment of the disclosure, the location information of the electronic device 10 may have been obtained by the electronic device 10 using a location sensor of the electronic device 10, such as a GPS. The electronic device 10 may detect movement of the electronic device 10 by using the location sensor, and update the location information of the electronic device 10 based on the detected movement.

According to an embodiment of the disclosure, the location information of the electronic device 10 may have been obtained by identifying, by the electronic device 10, a QR code provided at a pre-set place. Alternatively, the location information of the electronic device 10 may have been obtained by the electronic device 10 via a positioning technology using a beacon provided at a pre-set place. Alternatively, the location information of the electronic device 10 may have been obtained by using a seat number of a space where data about a structure, such as a stadium, a theater, or an exhibition hall, is pre-obtained.

According to an embodiment of the disclosure, the field of view information of the electronic device 10 may be obtained by the electronic device 10 from a location or operation sensor, such as a gyro sensor. The electronic device 10 may detect movement of the electronic device 10 by using the location or operation sensor, and update the field of view information of the electronic device 10 based on the detected movement.

According to an embodiment of the disclosure, the field of view information of the electronic device 10 may have been obtained by a field of view on an image obtained by a camera of the electronic device 10. For example, the field of view information of the electronic device 10 for displaying the augmented reality content 170 on the image obtained by using the camera located on a rear surface of the electronic device 10 may be information about a direction perpendicular to the rear surface of the electronic device 10.

According to an embodiment of the disclosure, the field of view information of the electronic device 10 may have been obtained by comparing images obtained by the camera of the electronic device 10.

Referring to operation 320 of FIG. 3, the electronic device 10 may obtain, by using the camera, the image 110 with respect to a real space including a target object. For example, the electronic device 10 may obtain an image by photographing a stadium including an athlete.

Because the electronic device 10 continuously obtains the image 110 while providing the augmented reality content 170 to the user, the obtaining of the image 110 is not limited to a specific operation.

Referring to operation 330 of FIG. 3, the electronic device 10 may identify and track the target object 130 from the image 110. For example, the electronic device 10 may identify an athlete from an image of a stadium and track movement of the athlete.

Operation 330 is not essential and thus may be omitted. Alternatively, operation 330 may be performed together with operation 320, and like operation 320, operation 330 may be continuously performed while the electronic device 10 provides the augmented reality content 170 to the user.

Referring to operation 340 of FIG. 3, the server 20 may generate the augmented reality content 170. The server 20 may identify a location of the electronic device 10 and a direction in which the electronic device 10 is facing, based on the location information and field of view information of the electronic device 10. The server 20 may identify the target object 130, based on the location of the electronic device 10 and the direction in which the electronic device 10 is facing. The server 20 may generate the augmented reality content 170 about the identified target object 130.

For example, based on the location information and field of view information of the electronic device 10 in a stadium, the server 20 may identify an athlete from an image displayed on the electronic device 10 and generate augmented reality content regarding the athlete.

According to an embodiment of the disclosure, the server 20 may identify the location of the electronic device 10 and the direction in which the electronic device 10 is facing in the real space, by applying the location information and field of view information of the electronic device 10 to the data about the structure, which is stored in a DB.

According to an embodiment of the disclosure, the server 20 may generate the virtual 3D space 210 and match the virtual 3D space 210 to the real space, based on the location information and field of view information of the electronic device 10, thereby identifying a location of the electronic device 10 and a direction in which the electronic device 10 is facing on the virtual 3D space 210 matched to the real space.

The server 20 may identify the target object 130 included in the image 110 displayed on the electronic device 10, based on the identified location of the electronic device 10 and the identified direction in which the electronic device 10 is facing.

According to an embodiment of the disclosure, the server 20 may identify a location of the target object in the real space to identify the target object 130 on the image 110 displayed on the electronic device 10.

For example, the server 20 may identify the location of the target object in the real space by using a sensor attached to the target object. For example, the server 20 may identify the location of the target object in the real space from images obtained by using a plurality of cameras provided in the real space. As another example, the server 20 may identify the location of the target object in the real space from images obtained from a plurality of electronic devices.

The server 20 may identify the target object 130 present within a field of view of the electronic device 10 from the location of the target object in the real space, based on the location of the electronic device 10 and the direction in which the electronic device 10 is facing in the real space.

The server 20 may identify a location of the target object 230 in the virtual 3D space 210 matched to the real space, from the location of the target object in the real space. The server 20 may identify the target object 130 present within the field of view of the electronic device 10, from the location and direction of the electronic device 10 in the virtual 3D space 210.

The server 20 may generate the augmented reality content 170 for the identified target object 130. For example, the server 20 may generate augmented reality content, such as pitcher information, batter information, information about an offense, information about a defender, physical information of an athlete selected by a user, stat information of an athlete, information about a game, or information about a stadium.

According to an embodiment of the disclosure, the server 20 may generate the augmented reality content 170 according to a type selected by the user. For example, the server 20 may generate the augmented reality content 170 including a batting average, runs batted in, and stat of a baseball player, in response to the user selecting information about stat of the baseball player.

According to an embodiment of the disclosure, the server 20 may generate AR location information about a location where the augmented reality content 170 is to be displayed on the electronic device 10. For example, the server 20 may generate the AR location information about the vicinity of the target object 130 in the image 110. Alternatively, the server 20 may generate the AR location information about a pre-set location (for example, upper center) in the image 110. The AR location information may be included in the augmented reality content 170 or separately generated.

Referring to operation 350 of FIG. 3, the server 20 may transmit data about the augmented reality content 170 to the electronic device 10. Here, the server 20 may also transmit the AR location information of the augmented reality content 170 to the electronic device 10. In addition, at least one of the server 20 or the electronic device 10 may measure a delay time generated when data is transmitted and received.

Referring to operation 360 of FIG. 3, the electronic device 10 may identify the AR location information and the location information of the target object 130.

According to an embodiment of the disclosure, the electronic device 10 may obtain a plurality of images including the target object 130 and identify the target object 130 from each of the plurality of images, thereby accumulating and obtaining pieces of location information of the target object 130 on the image 110.

According to an embodiment of the disclosure, the electronic device 10 may identify the target object 130 from each of the plurality of images, thereby identifying a moving speed and moving direction of the target object 130 on the plurality of images. The electronic device 10 may obtain the location information of the target object 130 from the moving speed and moving direction of the target object 130.

According to an embodiment of the disclosure, the electronic device 10 may identify the moving direction and moving speed of the target object 130 on the image 110, by detecting movement of the electronic device 10. The electronic device 10 may obtain the location information of the target object 130 from the moving speed and moving direction of the target object 130.

According to an embodiment of the disclosure, the electronic device 10 may identify at least one landmark from the image 110 and segment the image 110 into a plurality of grids, based on the landmark. The landmark denotes a feature point on an image. For example, a base, a mound, or a baseline of a baseball field, or a line or a goalpost of a soccer stadium may correspond to the landmark. The electronic device 10 may identify the moving direction and moving speed of the target object 130 on the image 110, by using the plurality of grids as coordinates. The electronic device 10 may obtain the location information of the target object 130 from the moving speed and moving direction of the target object 130.

According to an embodiment of the disclosure, the electronic device 10 may identify the location where the augmented reality content 170 is to be displayed on the image 110, by using the AR location information received from the server 20.

Referring to operation 370 of FIG. 3, the electronic device 10 may display the augmented reality content 170 on the image 110. The electronic device 10 may identify the location where the augmented reality content 170 is to be displayed, by comparing the AR location information received from the server 20 with the location information of the target object 130. When the location information of the identified target object 130 and first AR location information received from the server 20 are different from each other, the electronic device 10 may identify the location information of the target object 130, which is recently obtained, as second AR location information.

According to an embodiment of the disclosure, the electronic device 10 may identify the location where the augmented reality content 170 is to be displayed, by comparing the first AR location information received from the server 20 with pieces of location information of the target object 130 accumulated and obtained from the plurality of images.

For example, when the first AR location information is the same as past location information from among the accumulated and obtained pieces of location information of the target object 130, the electronic device 10 may identify the recently obtained location information of the target object 130 as the second AR location information.

According to an embodiment of the disclosure, the electronic device 10 may identify the location where the augmented reality content 170 is to be displayed, by comparing the AR location information with the location information of the target object 130 identified based on the moving direction and moving speed of the target object 130 on the image 110.

For example, the electronic device 10 may identify the moving direction and moving speed of the target object 130 on the image 110, by detecting movement of the electronic device 10. The electronic device 10 may identify the location where the augmented reality content 170 is to be displayed, by comparing the AR location information with the location information of the target object 130 identified according to the moving speed and moving direction of the target object 130.

As another example, the electronic device 10 may identify at least one landmark from the image 110 and segment the image 110 into a plurality of grids, based on the landmark. The electronic device 10 may identify the moving direction and moving speed of the target object 130 on the image 110, based on the plurality of grids. The electronic device 10 may identify the location where the augmented reality content 170 is to be displayed, by comparing the AR location information with the location information of the target object 130 identified according to the moving speed and moving direction of the target object 130.

According to an embodiment of the disclosure, the electronic device 10 may compare a delay time while data is transmitted and received with the server 20 to a threshold value, and when the delay time exceeds the threshold value, identify, as the second AR location information, the location information of the target object 130 identified by the electronic device 10.

For example, the electronic device 10 may identify, as the second AR location information, the location information of the target object 130, on which the delay time while the data is transmitted and received with the server 20 is reflected, based on the moving speed of the target object 130. In other words, when the first AR location information received from the server 20 and the location information of the target object 130 identified from a result of calculating the moving speed of the target object 130 and the delay time while the data is transmitted and received with the server 20 are different from each other, the electronic device 10 may identify, as the second AR location information, the location information of the target object 130 identified from the result of calculating.

The electronic device 10 may correct the location where the augmented reality content 170 is displayed by changing the first AR location information to the second AR location information.

Figure 4:
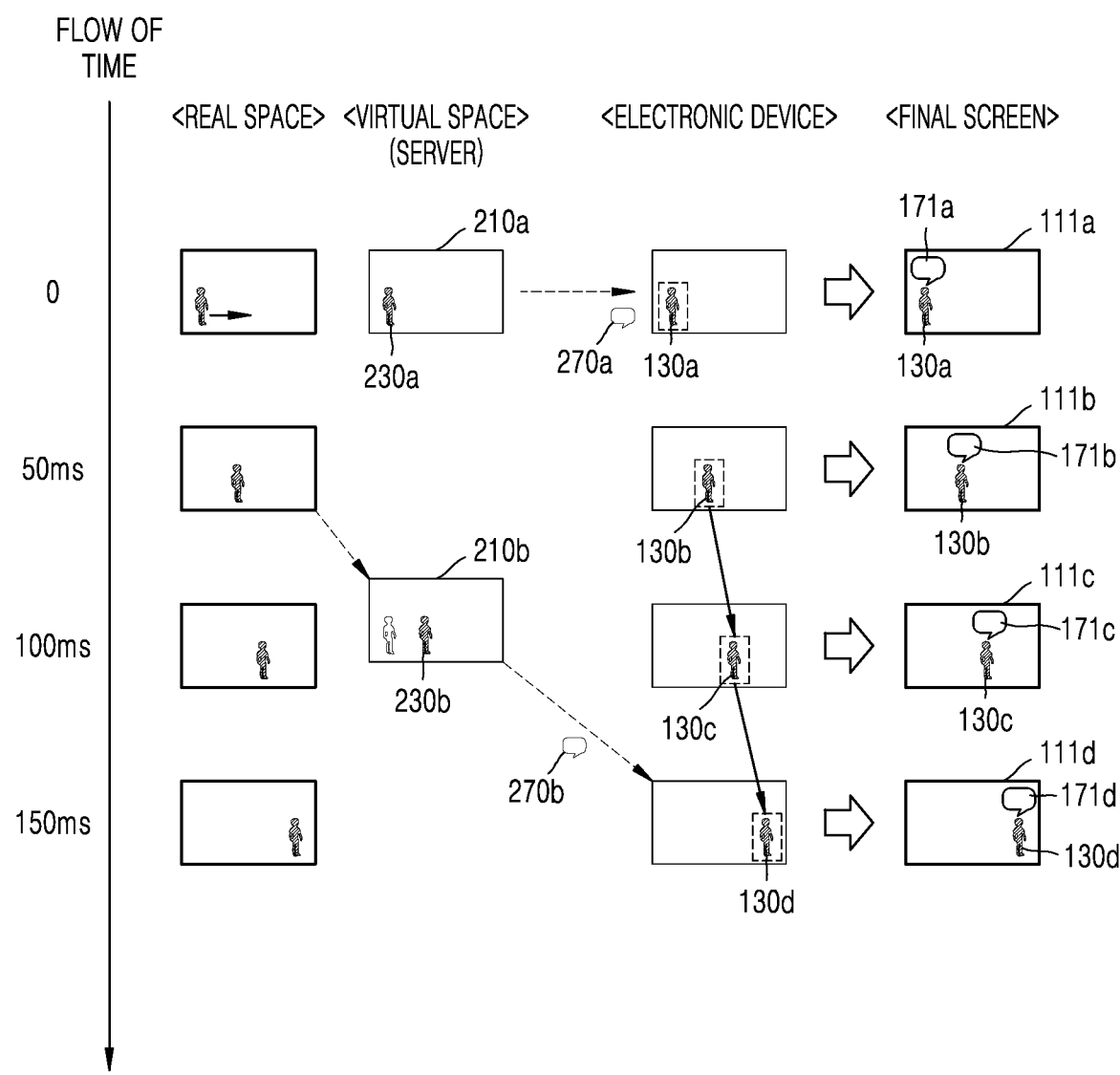
FIG. 4 is a diagram illustrating a method, performed by an electronic device, of displaying augmented reality content received from a server according to an embodiment of the disclosure.

FIG. 4 is a diagram illustrating a method, performed by an electronic device, of displaying an augmented reality content received from a server according to an embodiment of the disclosure.

Referring to FIG. 4, the electronic device 10 according to an embodiment of the disclosure may display the augmented reality content 170 according to a location of the target object 130 that moves to the right during a delay time generated while data is transmitted and received with the server 20.

More particularly, at 0 ms, because a location of a target object in a real space, a location of the target object 230a on the virtual 3D space 210a generated by the server 20, and a location of the target object 130a in an image 111a displayed on the electronic device 10 are matched, it is determined that the electronic device 10 displays augmented reality content 171a according to the location of the target object 130a, by using the augmented reality content 270a received from the server 20.

At 50 ms, the target object 230b in the real space and the target object 130b in an image 111b displayed on the electronic device 10 have moved to the right compared to the target object at 0 ms. Even when there is no augmented reality content additionally received from the server 20, the electronic device 10 may identify and track the target object 130b, thereby displaying augmented reality content 171b near the target object 130b.

The server 20 generates the augmented reality content 270b at a location corresponding to the target object 230b in the real space and the target object 130b in the image 111b displayed on the electronic device 10 at 50 ms, and transmits the augmented reality content 270b to the electronic device 10.

In addition, at 100 ms, the electronic device 10 may identify and track a moving target object 130c, and display augmented reality content 171c near the target object 130c in an image 111c displayed on the electronic device 10.

At 100 ms and 150 ms, because the target object of the real space and the target objects 130c and 130d on images 111c and 111d displayed on the electronic device 10 have further moved to the right, location information of the target object 130d identified and tracked by the electronic device 10 may be the same as first AR location information of the augmented reality content 270b received from the server 20.

At 150 ms, the electronic device 10 may identify that the location information of the target object 130d is not the same as the first AR location information of the augmented reality content 270b received from the server 20. The electronic device 10 may identify the location information of the target object 130d as second AR location information and change the first AR location information to the second AR location information. The electronic device 10 may display augmented reality content 171d near the target object 130d on the image 111d, based on the second AR location information.

Referring to FIGS. 2 and 4, the method of FIG. 4 may provide natural augmented reality content to a user compared to the method of FIG. 2.

Figure 5:
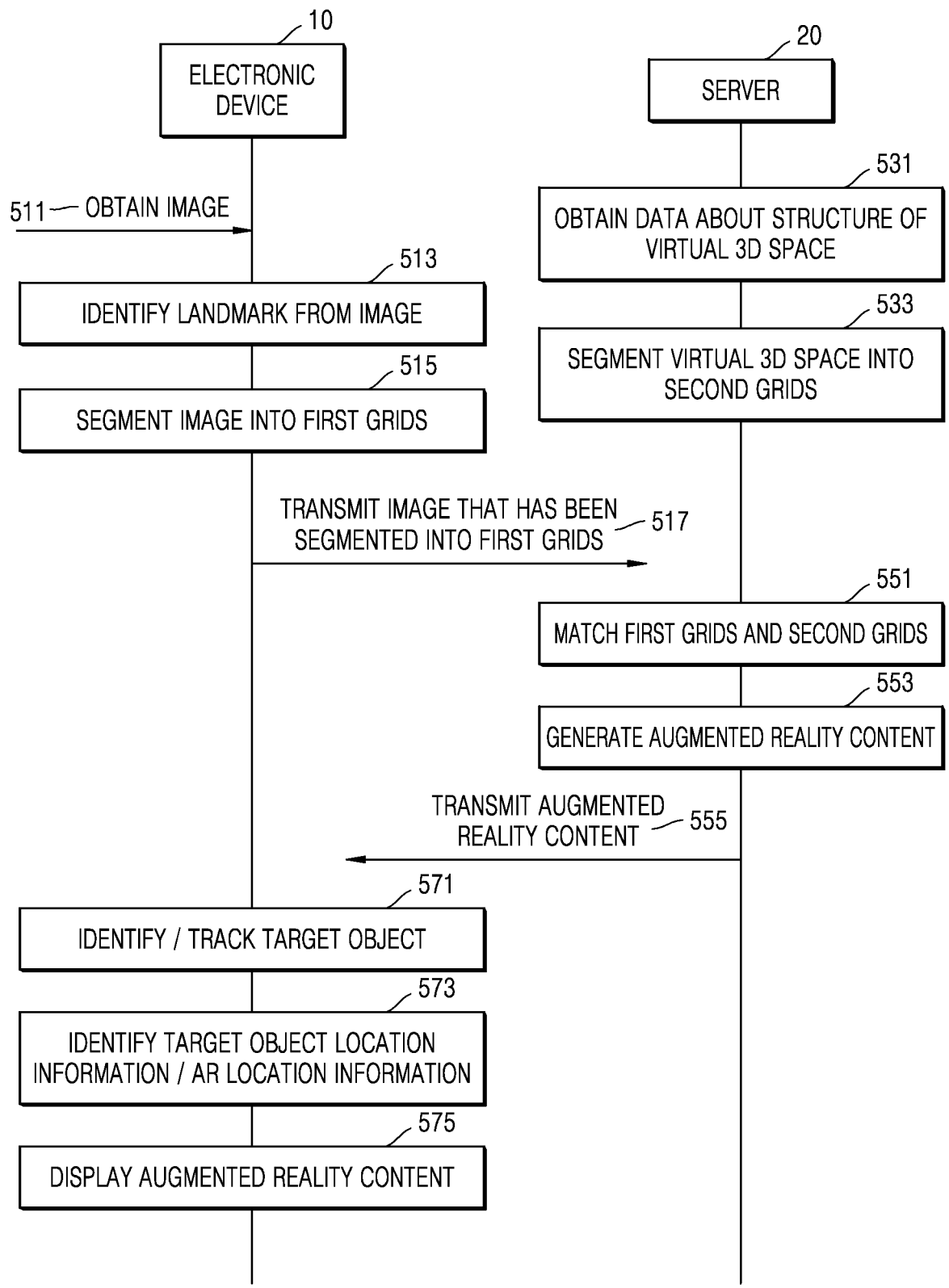
FIG. 5 is a flowchart of a method, performed by an electronic device, of displaying augmented reality content received from a server according to an embodiment of the disclosure.
Figure 6:
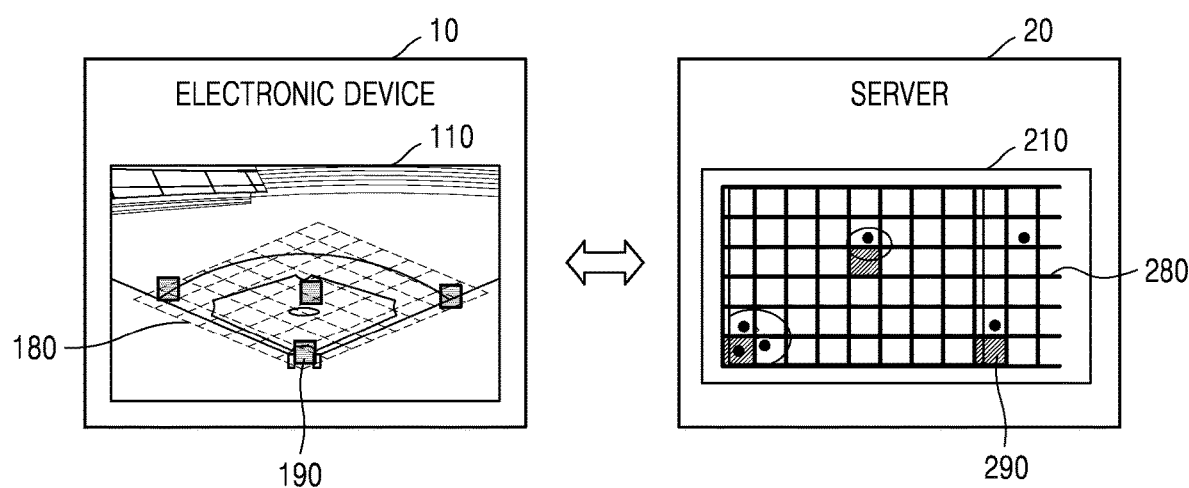
FIG. 6 is a diagram illustrating a method of matching an image obtained by an electronic device and a virtual 3-dimensional (3D) space of a server according to an embodiment of the disclosure.
Figure 7:
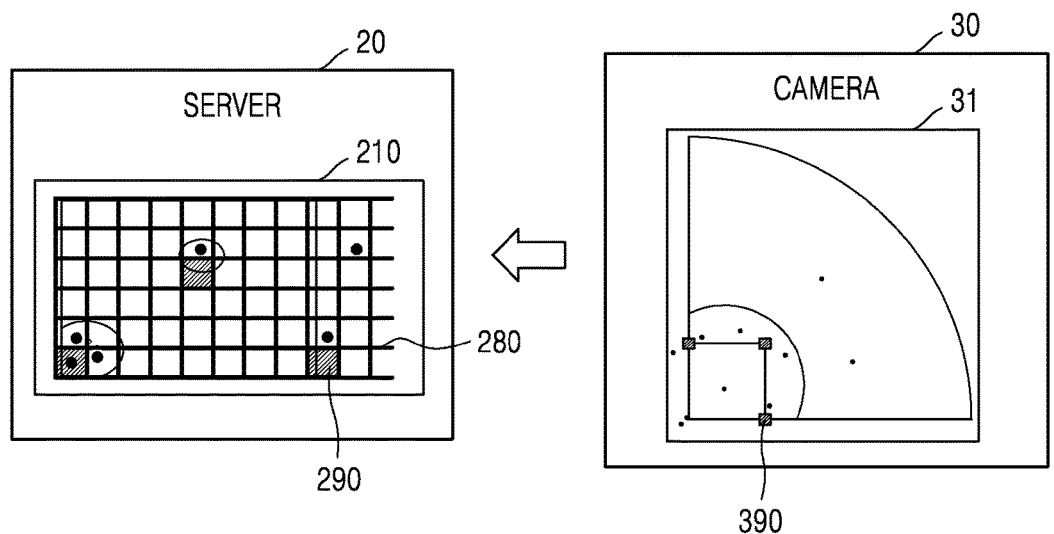
FIG. 7 is a diagram illustrating a method, performed by a server, of identifying and matching a location of a target object obtained by using a camera according to an embodiment of the disclosure.

FIG. 5 is a flowchart of a method, performed by an electronic device, of displaying an augmented reality content received from a server according to an embodiment of the disclosure; FIG. 6 is a diagram illustrating a method of matching an image obtained by an electronic device and a virtual 3D space of a server according to an embodiment of the disclosure; and FIG. 7 is a diagram illustrating a method, performed by a server, of identifying and matching a location of a target object obtained by using a camera according to an embodiment of the disclosure.

According to an embodiment of the disclosure, the image 110 and the virtual 3D space 210 may be matched via landmarks and grids.

Referring to operation 511 of FIGS. 5 and 6, the electronic device 10 may obtain, by using the camera 30, the image 110 with respect to a real space including a target object. For example, the electronic device 10 may obtain the image 100 by photographing a baseball field including a baseball player. Because embodiments of the disclosure described with reference to operation 320 of FIG. 3 may be inferred and applied to operation 511 of FIG. 5, redundant descriptions are omitted.

Referring to operation 513 of FIGS. 5 and 6, the electronic device 10 may identify a first landmark 190 from the image 110. For example, the electronic device 10 may identify, as the first landmarks 190, bases of the baseball field from the image 110.

According to an embodiment of the disclosure, the electronic device 10 may identify the first landmark 190 from the image 110 by applying the image 110 to an AI neural network. The AI neural network may include a model trained to obtain a feature point from the image 110 and output, to the electronic device 10, a result of identifying the first landmark 190 based on the feature point.

Referring to operation 515 of FIGS. 5 and 6, the electronic device 10 may segment the image 110 into first grids 180. The electronic device 10 may set the first grids 180 of segmenting the image 110 into a plurality of regions, based on the first landmarks 190. For example, the electronic device 10 may set the first grids 180 of segmenting regions between the bases in the image 110 in a certain ratio. The electronic device 10 may set the first grids 180 as coordinates.

Referring to operation 517 of FIGS. 5 and 6, the electronic device 10 may transmit, to the server 20, the image 110 where the first grids 180 are set. For example, the electronic device 10 may transmit, to the server 20, the image 110 where the first grids 180 are displayed. As another example, the electronic device 10 may transmit, to the server 20, the first grids 180 together with the image 110. In this case, coordinates may be set in the first grids 180.

Referring to operation 531 of FIGS. 5 and 6, the server 20 may obtain data about a structure of the virtual 3D space 210. For example, the server 20 may obtain the data from a DB storing data about structures of spaces, such as a stadium, a theater, and an exhibition hall.

Referring to operation 533 of FIGS. 5 and 6, the server 20 may segment the virtual 3D space 210 into second grids 280.

According to an embodiment of the disclosure, the server 20 may identify a second landmark 290 from the virtual 3D space 210, and set the second grids 280 based on the second landmarks 290.

For example, the server 20 may identify the second landmark 290 from the virtual 3D space 210 stored in the DB 27. More particularly, the server 20 may identify, as the second landmarks 290, bases of a baseball field from the data about the structure of the baseball field stored in the DB 27. In this case, the second landmark 290 may be pre-set in the data about the structure.

Referring to FIG. 7, the server 20 may identify the second landmark 290 from an image 31 captured by the camera 30 that photographs the real space. More particularly, the server 20 may identify the second landmark 290 from the image 31 by applying the image 31 including a landmark 390 to an AI neural network. The AI neural network may include a model trained to obtain a feature point from the image 31 and output, to the server 20, a result of identifying the second landmark 290 based on the feature point.

In addition, the server 20 may identify the second grids 280 of segmenting the virtual 3D space 210 into a plurality of regions, based on the second landmarks 290. For example, the server 20 may identify the second grids 280 of segmenting regions between the bases in the virtual 3D space 210 in a certain ratio. In this case, the second grids 280 may be pre-set in the data about the structure. Alternatively, the second grids 280 may be set by the server 20 on the virtual 3D space 210, based on the second landmarks 290. Meanwhile, coordinates may be set in the second grids 280.

Referring to operation 551 of FIGS. 5 and 6, the server 20 may match the first grids 180 and the second grids 280. The server 20 may match the image 110 and the virtual 3D space 210 by matching the first grids 180 and the second grids 280.

According to an embodiment of the disclosure, the server 20 may match the first grids 180 and the second grids 280 by comparing the first landmarks 190 and the second landmarks 290.

According to an embodiment of the disclosure, the server 20 may match the first grids 180 and the second grids 280 by comparing the coordinates set in the first grids 180 and the coordinates set in the second grids 280.

According to an embodiment of the disclosure, the first grids 180 and the second grids 280 may be matched, based on location and field of view information of the electronic device 10. For example, the server 20 may identify the virtual 3D space 210 corresponding to the location of the electronic device 10 in the real space, by applying the location information of the electronic device 10 received from the electronic device 10 to the data about the structure of the space. In addition, the server 20 may identify a field of view of the electronic device 10 in the virtual 3D space 210 from the field of view information of the electronic device 10 received from the electronic device 10 and match the second landmark 290 to the first landmark 190 identified from the image 110. The server 20 may match the first grids 180 and the second grids 280, based on the matched first landmark 190 and second landmark 290.

Referring to operation 553 of FIG. 5, the server 20 may generate the augmented reality content 170. For example, the server 20 may identify an athlete in a baseball field and generate the augmented reality content 170 including information about the athlete. More particularly, the server 20 may generate the augmented reality content 170 by obtaining, from the DB, information about the target object 230, such as pitcher information, batter information, information about an offense, information about a defender, physical information of an athlete selected by a user, stat information of an athlete, information about a game, or information about a stadium.

According to an embodiment of the disclosure, the server 20 may generate the augmented reality content 170, based on location information of the target object 230 on the virtual 3D space 210. The server 20 may generate the augmented reality content 170 including the location information of the target object 230 on the virtual 3D space 210. Alternatively, the server 20 may generate data including the location information of the target object 230 on the virtual 3D space 210, separately from the augmented reality content 170.

The server 20 may obtain the location information of the target object 230 on the virtual 3D space 210, by identifying a location of a target object in the real space and applying the location to the data about the structure of the baseball field.

For example, the server 20 may identify the location of the target object in the real space by using a sensor attached to the target object in the real space, thereby obtaining the location information of the target object 230 on the virtual 3D space 210. More particularly, the server 20 may obtain location information of a baseball player in the baseball field by using a sensor attached to the baseball player.

As another example with reference to FIG. 7, the server 20 may identify a location of a target object from the image 31 obtained by the camera 30 photographing the real space, thereby obtaining the location information of the target object 230 on the virtual 3D space 210. More particularly, the server 20 may obtain location information of baseball players in a baseball field from images obtained by cameras photographing the baseball field at pre-set locations. In this case, the images may be obtained by a camera included in the electronic device 10 that transmitted the location information and field of view information to the server 20.

Referring to operation 555 of FIGS. 5 and 6, the server 20 may transmit the augmented reality content 170 to the electronic device 10.

According to an embodiment of the disclosure, the server 20 may transmit, to the electronic device 10, the augmented reality content 170 including the location information of the target object 230 on the virtual 3D space 210 as AR location information.

According to an embodiment of the disclosure, the server 20 may transmit, to the electronic device 10 together with the augmented reality content 170, data including the location information of the target object 230 on the virtual 3D space 210 as the AR location information, wherein the data is generated separately from the augmented reality content 170.

According to an embodiment of the disclosure, the server 20 may transmit, to the electronic device 10, only augmented reality content including information about a target object included in the field of view of the electronic device 10, based on the field of view information of the electronic device 10 received from the electronic device 10, from among pieces of augmented reality content about all target objects included in the virtual 3D space 210 generated in operation 531 of FIG. 5.

Referring to operation 571 of FIG. 5, the electronic device 10 may identify and track the target object 130 from the image 110. The electronic device 10 may track the target object 130 to obtain and update the location information of the target object 130.

According to an embodiment of the disclosure, the electronic device 10 may identify the location of the target object 130 included in the image 110 by using the first grids 180 as coordinates. For example, the electronic device 10 may identify a moving speed and moving direction of the target object 130 by obtaining and updating the location information of the target object 130 on a plurality of images, by using the first grids 180 as coordinates. The electronic device 10 may identify the moving speed and moving direction of the target object 130 by obtaining and updating the location information of the target object 130 output from the AI neural network, by applying the plurality of images segmented into the first grids 180 to the AI neural network.

According to an embodiment of the disclosure, the electronic device 10 may identify the target object 230 from the image 110, based on the location information of the target object 230 received from the server 20. In this case, the server 20 may identify a region where the target object 230 is located from among regions segmented by the second grids 280, and transmit, to the electronic device 10, the location information of the target object 230 by using the second grids 280 as coordinates.

Referring to operation 573 of FIG. 5, the electronic device 10 may identify the AR location information and the location information of the target object 130. The electronic device 10 may identify the location where the augmented reality content 170 is to be displayed, by comparing the AR location information received from the server 20 with the location information of the target object 130 obtained from the image 110.

According to an embodiment of the disclosure, the electronic device 10 may identify the location where the augmented reality content 170 is to be displayed, by comparing the location information of the target object 130 obtained by using the first grids 180 set as coordinates with the AR location information transmitted by the server 20 by using the second grids 280 as coordinates. The first grids 180 and the second grids 280 may have been matched in operation 551.

Referring to operation 575 of FIG. 5, the electronic device 10 may display the augmented reality content 170 on the identified location.

Because embodiments of the disclosure described with reference to operations 360 and 370 of FIG. 3 may be inferred and applied to operations 573 and 575 of FIG. 5, redundant descriptions are omitted.

By applying the embodiments of the disclosure of FIGS. 5 to 7 to the electronic device 10 and server 20, the electronic device 10 and server 20 may easily obtain the location information of the target objects 130 and 230 and easily track the target objects 130 and 230. In addition, the electronic device 10 may display the augmented reality content 170 at a location corresponding to the target object 130.

Figure 8:
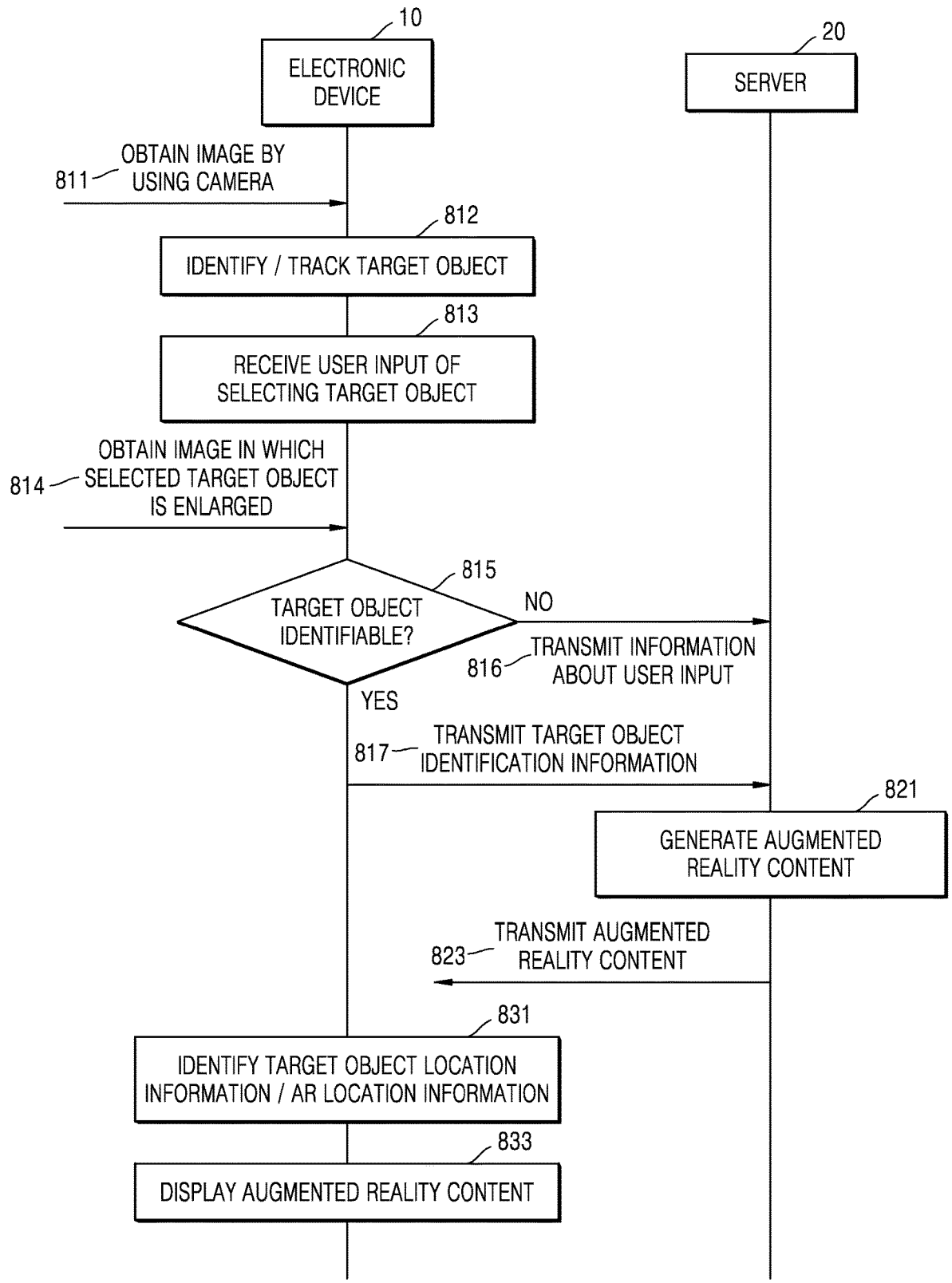
FIG. 8 is a flowchart of a method, performed by an electronic device, of displaying augmented reality content received from a server, based on a user input, according to an embodiment of the disclosure.
Figure 9:
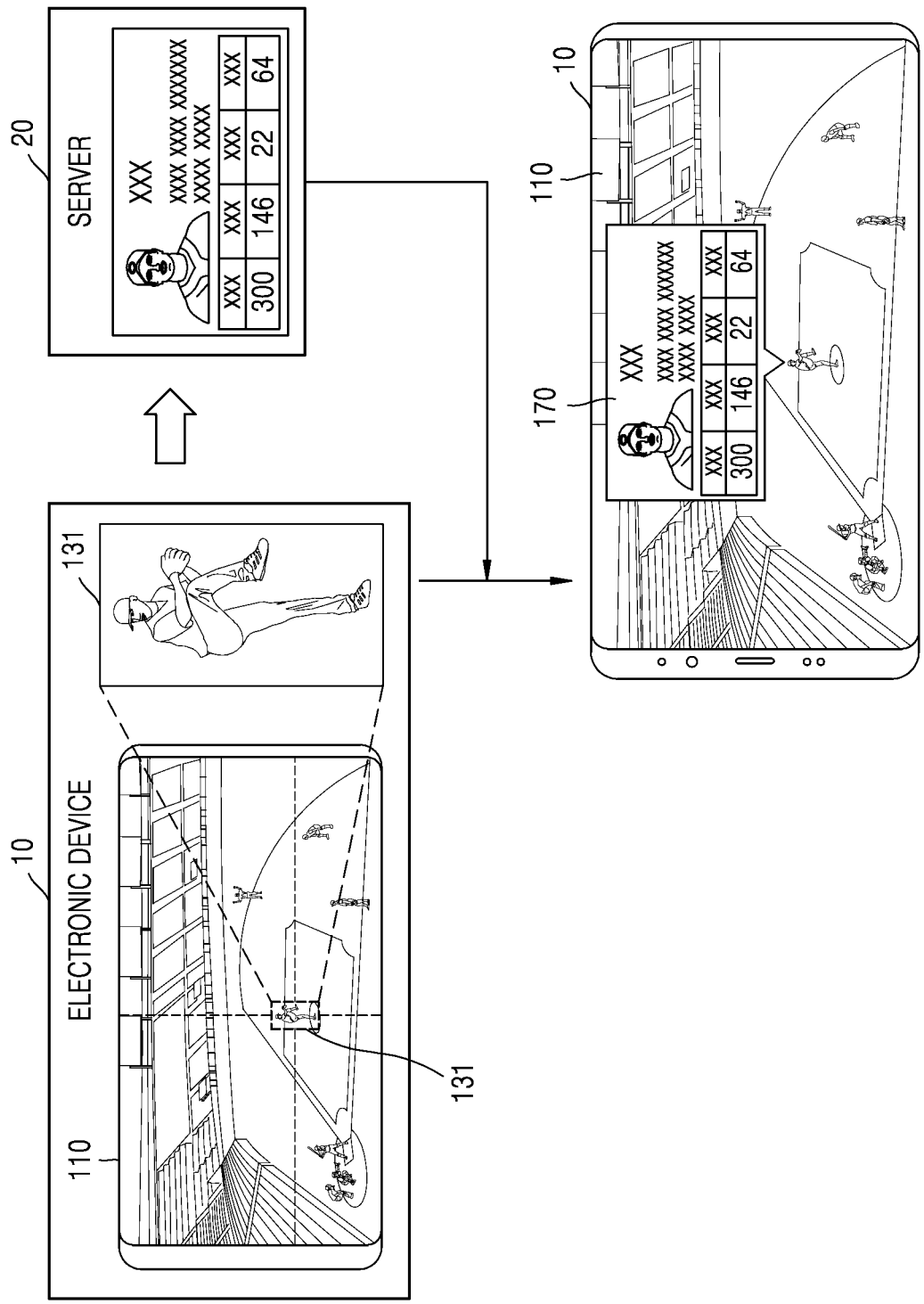
FIG. 9 is a diagram illustrating a method, performed by an electronic device, of displaying augmented reality content received from a server, based on a user input according to an embodiment of the disclosure.

FIG. 8 is a flowchart of a method, performed by an electronic device, of displaying an augmented reality content received from a server, based on a user input according to an embodiment of the disclosure; and FIG. 9 is a diagram illustrating a method, performed by an electronic device, of displaying an augmented reality content received from a server, based on a user input, according to an embodiment of the disclosure.

Referring to operation 811 of FIGS. 8 and 9, the electronic device 10 may obtain, by using a camera, the image 110 with respect to a real space including a target object. For example, the electronic device 10 may obtain the image 100 by photographing a baseball field including a baseball player. Because operation 811 of FIG. 8 is similar to operation 320 of FIG. 3 and operation 511 of FIG. 5, redundant descriptions are omitted.

Referring to operation 812 of FIG. 8, the electronic device 10 may identify and track the target object 130 from the image 110. The electronic device 10 may track the target object 130 to obtain and update the location information of the target object 130.

According to an embodiment of the disclosure, the electronic device 10 may identify and track at least one target object 130 from the image 110 by applying the image 110 to an AI neural network. The AI neural network may include a model trained to obtain a feature point from the image 110 and output, to the electronic device 10, a result of identifying the at least one target object 130 based on the feature point. The AI neural network may include a model trained to output, to the electronic device 10, results of identifying moving speeds and moving directions of target objects on a plurality of images applied from the electronic device 10. The model included in the AI neural network may be received by the electronic device 10 from the server 20.

According to an embodiment of the disclosure, the electronic device 10 may identify and track the at least one target object 130, based on the first landmarks 190 identified from the image 110. For example, the electronic device 10 may identify baseball players located near bases, and track movements of the baseball players.

According to an embodiment of the disclosure, the electronic device 10 may identify and track the at least one target object 130 from the image 110, by using the first grids 180 segmenting the image 110. For example, the electronic device 10 may identify, together with the bases, the baseball players included in regions segmented by the first grids 180. As another example, the electronic device 10 may identify coordinates set in the first grids 180 corresponding to the bases, and identify the baseball players near the identified coordinates. The electronic device 10 may track the baseball players by identifying moving speeds and moving directions of the baseball players by using the coordinates set in the first grids 180.

Referring to operation 813 of FIGS. 8 and 9, the electronic device 10 may receive an input of selecting a target object 131 from a user. For example, the electronic device 10 may receive a user input of selecting a pitcher on a mound, via a touch screen.

Referring to operation 814 of FIGS. 8 and 9, the electronic device 10 may obtain an image in which the target object 131 selected by the user is enlarged. The electronic device 10 may obtain the image in which the target object 131 selected by the user is enlarged, based on coordinates of a display corresponding to the user input.

According to an embodiment of the disclosure, the electronic device 10 may obtain the image in which the target object 131 is enlarged by photographing the target object 131 with the camera of the electronic device 10 using a telephoto lens.

According to an embodiment of the disclosure, the electronic device 10 may obtain the image in which the target object 131 is enlarged by capturing an image of the target object 131 with a high-resolution camera and cropping the image.

Referring to operation 815 of FIGS. 8 and 9, the electronic device 10 may determine whether the target object 131 is identifiable by obtaining information about the target object 131 from the enlarged image.

For example, the electronic device 10 may identify a uniform number of the pitcher from an image captured by enlarging the pitcher to determine whether it is possible to obtain player information corresponding to the identified uniform number. The electronic device 10 may determine that the target object 131 is not identifiable when the uniform number is unable to be identified because an image where the uniform number is hidden is obtained, a low-resolution image is obtained, or an unclear image is obtained due to shaking of the camera. The electronic device 10 may obtain, from a memory 17, the player information (for example, stat information) corresponding to the identified uniform number. Alternatively, the electronic device 10 may receive the player information from the server 20.

As another example, the electronic device 10 may identify a face of the pitcher from the image captured by enlarging the pitcher to determine whether it is possible to obtain the player information. The electronic device 10 may apply the image captured by enlarging the pitcher to an AI neural network to determine whether it is possible to obtain the player information based on an output of the AI neural network, which is a result of searching for a player corresponding to the captured image.

Referring to operation 816 of FIG. 8, the electronic device 10 may transmit, to the server 20, information about the input of the user selecting the target object 131. For example, the electronic device 10 may transmit, to the server 20, coordinates related to a region where the baseball player selected by the user is included. In this case, the coordinates may be set on the first grids 180. As another example, the electronic device 10 may transmit, to the server 20, coordinates of a display corresponding to the input of the user.

Referring to operation 817 of FIG. 8, the electronic device 10 may transmit, to the server 20, information about the target object 131 identified by the electronic device 10, based on information about the at least one target object 130 obtained in operation 815. For example, the electronic device 10 may transmit, to the server 20, the uniform number of the baseball player identified in operation 815. As another example, the electronic device 10 may transmit, to the server 20, information (for example, a name, physical information, stat information, and the like) of the baseball player obtained based on the uniform number of the baseball player.

Referring to operation 821 of FIGS. 8 and 9, the server 20 may generate the augmented reality content 170 about the target object 131 selected by the user.

According to an embodiment of the disclosure, the server 20 may identify the target object 131 based on information about the input of the user received from the electronic device 10 in operation 816, and generate the augmented reality content 170 about the target object 131. For example, the server 20 may identify the pitcher selected by the user from among the baseball players on the second grids 280 by comparing coordinates set on the first grids 180 and coordinates set on the second grids 280. As another example, the server 20 may identify the pitcher corresponding to the coordinates of the display of the electronic device 10, from the virtual 3D space 210 matched to field of view information of the electronic device 10. The server 20 may generate the augmented reality content 170 by using the name, physical information, stat information, and the like of the pitcher.

According to an embodiment of the disclosure, the server 20 may generate the augmented reality content 170 by using the information about the target object 131 obtained by the electronic device 10 in operation 817. For example, the server 20 may obtain the information (for example, the name, physical information, stat information, and the like) of the pitcher stored in the DB 27 by using the uniform number of the pitcher identified by the electronic device 10, and generate the augmented reality content 170 by using the obtained information. As another example, the server 20 may generate the augmented reality content 170 by using the information (for example, the name, physical information, stat information, and the like) of the pitcher received from the electronic device 10.

Because embodiments of the disclosure described with reference to operation 553 of FIG. 5 may be inferred and applied to operation 821 of FIG. 8, redundant descriptions are omitted.

Referring to operation 823 of FIGS. 8 and 9, the server 20 may transmit the generated augmented reality content 170 to the electronic device 10. Because embodiments of the disclosure described with reference to operation 555 of FIG. 5 may be inferred and applied to operation 823 of FIG. 8, redundant descriptions are omitted.

Referring to operation 831 of FIG. 8, the electronic device 10 may identify location information of the target object 131 obtained by tracking the target object 131 and AR location information received from the server 20. Because embodiments of the disclosure described with reference to operations 571 and 573 of FIG. 5 may be inferred and applied to operation 831 of FIG. 8, redundant descriptions are omitted.

Referring to operation 833 of FIGS. 8 and 9, the electronic device 10 may display the augmented reality content 170 received from the server 20, according to the location of the target object 131. Because embodiments of the disclosure described with reference to operations 573 and 575 of FIG. 5 may be inferred and applied to operation 833 of FIG. 8, redundant descriptions are omitted.

By applying the embodiments of the disclosure of FIGS. 8 and 9 to the electronic device 10 and server 20, the electronic device 10 and server 20 may provide, to the user, the augmented reality content 170 about the target object 131 selected by the user.

Figure 10:
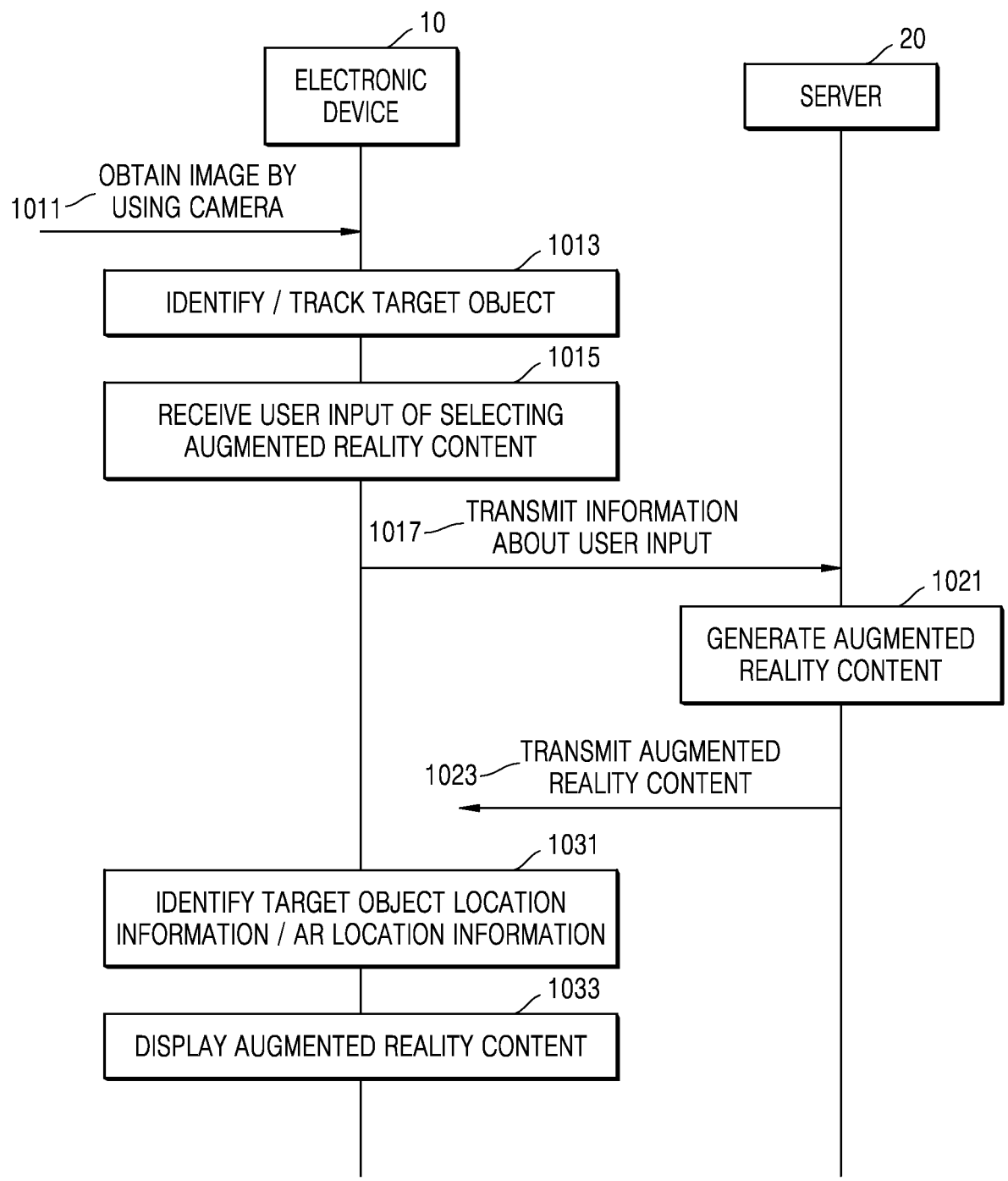
FIG. 10 is a flowchart of a method, performed by an electronic device, of displaying augmented reality content received from a server, based on a user input, according to an embodiment of the disclosure.

FIG. 10 is a flowchart of a method, performed by an electronic device, of displaying an augmented reality content received from a server, based on a user input, according to an embodiment of the disclosure.

Referring to FIG. 10, in operation 1011, the electronic device 10 may obtain, by using a camera, the image 110 with respect to a real space including a target object. Because embodiments of the disclosure described with reference to operation 320 of FIG. 3 may be inferred and applied to operation 1011 of FIG. 10, redundant descriptions are omitted.

Referring to operation 1013 of FIG. 10, the electronic device 10 may identify and track the target object 130 from the image 110. Because embodiments of the disclosure described with reference to operation 812 of FIG. 8 may be inferred and applied to operation 1013 of FIG. 10, redundant descriptions are omitted.

Referring to operation 1015 of FIG. 10, the electronic device 10 may receive a user input of selecting the augmented reality content 170. The electronic device 10 may provide an interface for receiving the user input of selecting the augmented reality content 170.

For example, the electronic device 10 may display a graphics user interface (GUI) for selecting a type of the augmented reality content 170 and a target object of the augmented reality content 170. The electronic device 10 may provide a pre-set of the type of augmented reality content 170 and the target object of the augmented reality content 170 to provide the interface enabling the user to quickly select the desired augmented reality content 170.

More particularly, the electronic device 10 may receive the user input of selecting the type of the augmented reality content 170, such as baseball player information, information about a game being played, and information about a stadium. The electronic device 10 may receive the user input of selecting the target object of the augmented reality content 170, such as information about a home team, information about a visiting team, information about offenses, information about defenders, information about a pitcher, and information about a batter.

Referring to operation 1017 of FIG. 10, the electronic device 10 may transmit, to the server 20, information about the received user input. For example, the electronic device 10 may transmit, to the server 20, information about the type of the augmented reality content 170 and target object of the augmented reality content 170, which are selected by the user. More particularly, the electronic device 10 may transmit, to the server 20, the information about the type of the augmented reality content 170 selected by the user, such as the baseball player information, the information about a game being played, and the information about a stadium. The electronic device 10 may transmit, to the server 20, information about the target object of the augmented reality content 170 selected by the user, such as the information about a home team, the information about a visiting team, the information about offenses, the information about defenders, the information about a pitcher, and the information about a batter.

Referring to operation 1021 of FIG. 10, the server 20 may generate the augmented reality content 170, based on the information about the user input received from the electronic device 10. For example, the server 20 may generate the augmented reality content 170 corresponding to the information about the type of the augmented reality content 170 and the target object of the augmented reality content 170, selected by the user.

More particularly, the server 20 may generate the augmented reality content 170 corresponding to the information about the type of the augmented reality content 170 selected by the user, such as the baseball player information, the information about a game being played, and the information about a stadium. The server 20 may generate the augmented reality content 170 corresponding to the information about the target object of the augmented reality content 170 selected by the user, such as the information about a home team, the information about a visiting team, the information about offenses, the information about defenders, the information about a pitcher, and the information about a batter. Because embodiments of the disclosure described with reference to operation 553 of FIG. 5 and operation 821 of FIG. 8 may be inferred and applied to operation 1021 of FIG. 10, redundant descriptions are omitted.

Referring to operation 1023 of FIG. 10, the server 20 may transmit the generated augmented reality content 170 to the electronic device 10. Because embodiments of the disclosure described with reference to operation 555 of FIG. 5 and operation 823 of FIG. 8 may be inferred and applied to operation 1023 of FIG. 10, redundant descriptions are omitted.

Referring to operation 1031 of FIG. 10, the electronic device 10 may identify location information of the target object 130 obtained by tracking the target object 130 and AR location information received from the server 20. Because embodiments of the disclosure described with reference to operations 571 and 573 of FIG. 5 and operation 831 of FIG. 8 may be inferred and applied to operation 1031 of FIG. 10, redundant descriptions are omitted.

Referring to operation 1033 of FIG. 10, the electronic device 10 may display the augmented reality content 170 received from the server 20, according to the location of the target object 130. Because embodiments of the disclosure described with reference to operations 573 and 575 of FIG. 5 and operation 833 of FIG. 8 may be inferred and applied to operation 1033 of FIG. 10, redundant descriptions are omitted.

By applying the embodiment of the disclosure of FIG. 10 to the electronic device 10 and server 20, the electronic device 10 and server 20 may provide, to the user, the augmented reality content 170 selected by the user.

Figure 11:
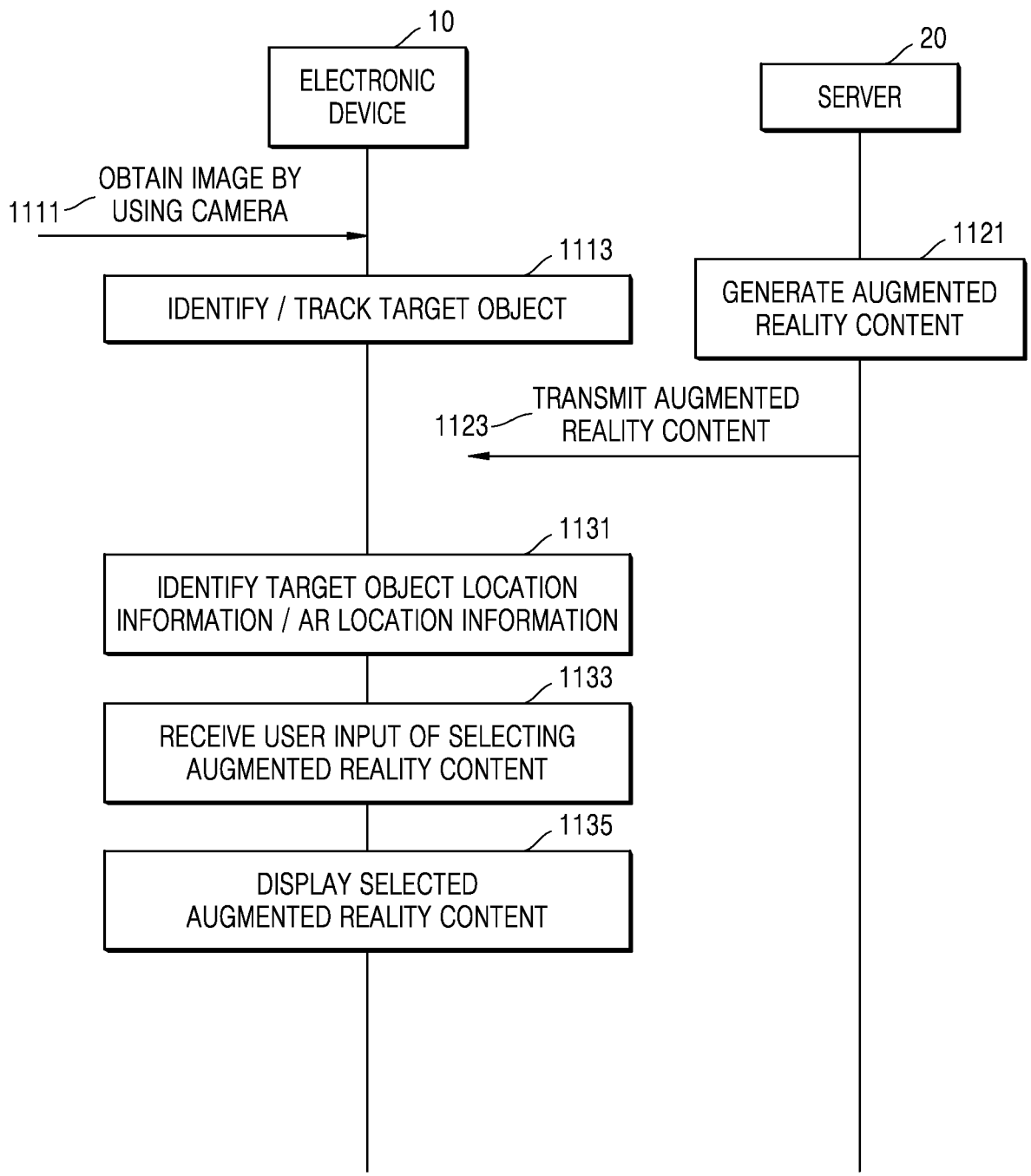
FIG. 11 is a flowchart of a method, performed by an electronic device, of displaying augmented reality content received from a server, based on a user input, according to an embodiment of the disclosure.

FIG. 11 is a flowchart of a method, performed by an electronic device, of displaying an augmented reality content received from a server, based on a user input, according to an embodiment of the disclosure.

Referring to FIG. 11, in operation 1111, the electronic device 10 may obtain, by using a camera, the image 110 with respect to a real space including a target object. Because embodiments of the disclosure described with reference to operation 320 of FIG. 3 and operation 1011 of FIG. 10 may be inferred and applied to operation 1111 of FIG. 11, redundant descriptions are omitted.

Referring to operation 1113 of FIG. 11, the electronic device 10 may identify and track the target object 130 from the image 110. Because embodiments of the disclosure described with reference to operation 812 of FIG. 8 and operation 1013 of FIG. 10 may be inferred and applied to operation 1113 of FIG. 11, redundant descriptions are omitted.

Referring to operation 1121 of FIG. 11, the server 20 may generate the augmented reality content 170. The server 20 may pre-generate all pieces of augmented reality content 170 that may be displayed on the electronic device 10.

For example, the server 20 may generate the augmented reality content 170 corresponding to information about a type of the augmented reality content 170 and a target object of the augmented reality content 170, selected by a user. More particularly, the server 20 may generate the augmented reality content 170 corresponding to the information about the type of the augmented reality content 170 selectable by the user, such as baseball player information, information about a game being played, and information about a stadium. The server 20 may generate the augmented reality content 170 corresponding to the information about the target object of the augmented reality content 170 selectable by the user, such as information about a home team, information about a visiting team, information about offenses, information about defenders, information about a pitcher, and information about a batter.

As another example, the server 20 may generate the augmented reality content 170 about target objects included in a field of view of the electronic device 10. In this case, the server 20 may identify a target object included in the virtual 3D space 210 matched to the field of view of the electronic device 10 and generate the augmented reality content 170 about the identified target object.

Because embodiments of the disclosure described with reference to operation 553 of FIG. 5, operation 821 of FIG. 8, and operation 1021 of FIG. 10 may be inferred and applied to operation 1121 of FIG. 11, redundant descriptions are omitted.

Referring to operation 1123 of FIG. 11, the server 20 may transmit the generated augmented reality content 170 to the electronic device 10. Because embodiments of the disclosure described with reference to operation 555 of FIG. 5, operation 823 of FIG. 8, and operation 1023 of FIG. 10 may be inferred and applied to operation 1123 of FIG. 11, redundant descriptions are omitted.

Referring to operation 1131 of FIG. 11, the electronic device 10 may identify location information of the target object obtained by tracking the target object and AR location information received from the server 20. Because embodiments of the disclosure described with reference to operations 571 and 573 of FIG. 5, operation 831 of FIG. 8, and operation 1031 of FIG. 10 may be inferred and applied to operation 1131 of FIG. 11, redundant descriptions are omitted.

Referring to operation 1133 of FIG. 11, the electronic device 10 may receive a user input of selecting the augmented reality content 170. The electronic device 10 may provide an interface for receiving the user input of selecting the augmented reality content 170. For example, the electronic device 10 may display a GUI for selecting the type of the augmented reality content 170 and the target object of the augmented reality content 170. The electronic device 10 may a provide pre-set the type of augmented reality content 170 and the target object of the augmented reality content 170 to provide the interface enabling the user to quickly select the desired augmented reality content 170. Because embodiments of the disclosure described with reference to operation 1015 of FIG. 10 may be inferred and applied to operation 1133 of FIG. 11, redundant descriptions are omitted.

Referring to operation 1135 of FIG. 11, the electronic device 10 may display the augmented reality content 170 selected by the user. The electronic device 10 may display only the augmented reality content 170 selected by the user, from among pieces of augmented reality content received from the server 20.

For example, the electronic device 10 may display the type of augmented reality content 170 selected by the user, from among the pieces of augmented reality content transmitted from the server 20. More particularly, the electronic device 10 may display augmented reality content corresponding to information about a pitcher selected by the user, from among the information about the type of the augmented reality content 170 received from the server 20, such as the baseball player information, the information about a game being played, and the information about a stadium, and the information about the target object of the augmented reality content 170, such as the information about a home team, the information about a visiting team, the information about offenses, the information about defenders, the information about a pitcher, and the information about a batter.

By applying the embodiment of the disclosure of FIG. 11 to the electronic device 10 and server 20, the electronic device 10 and server 20 may immediately provide the augmented reality content 170 in response to an input of the user.

Figure 12:
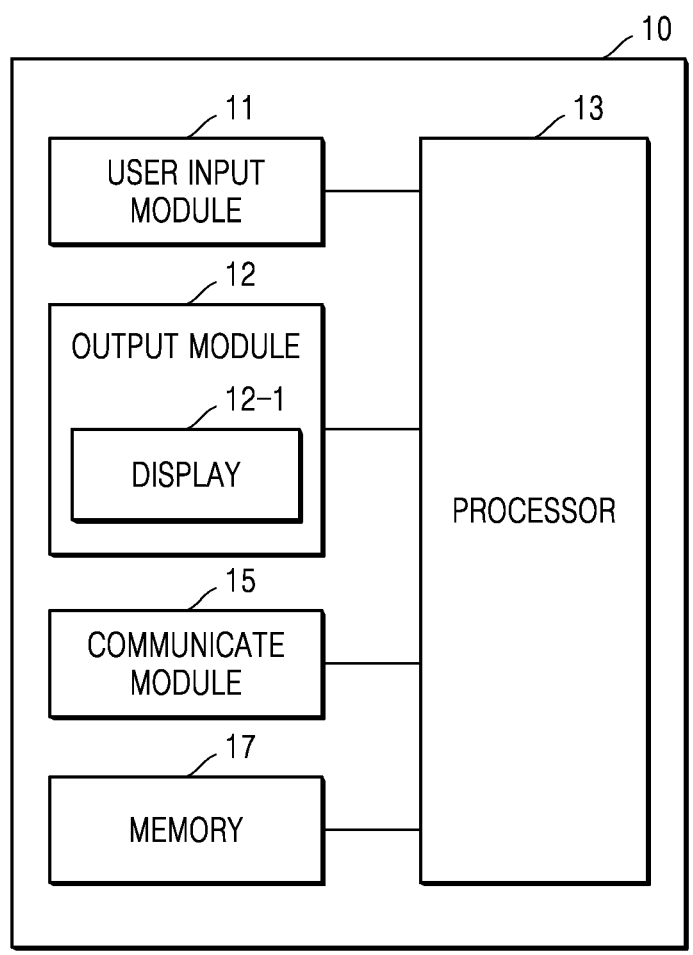
FIG. 12 is a block diagram of an electronic device according to an embodiment of the disclosure.

FIG. 12 is a block diagram of an electronic device according to an embodiment of the disclosure.

Referring to FIG. 12, the electronic device 10 may include a user input module 11, an output module 12, a processor 13, a communicate module 15, and the memory 17. However, the components shown in FIG. 12 are not all essential components of the electronic device 10. The electronic device 10 may include more or fewer components than those shown in FIG. 12.

The user input module 11 is a unit into which a user inputs data for controlling the electronic device 10. For example, the user input module 11 may include a key pad, a dome switch, a touch pad (contact capacitance type, pressure resistive type, an infrared (IR) detection type, surface ultrasonic wave conduction type, integral tension measuring type, piezo-effect type, or the like), a touch screen, a jog wheel, a jog switch, or the like, but is not limited thereto.

The user input module 11 may receive a user input required by the electronic device 10 to perform the embodiments of the disclosure described with reference to FIGS. 1 to 11.

The output module 12 outputs information processed by the electronic device 10. The output module 12 may output information related to the embodiments of the disclosure described with reference to FIGS. 1 to 11. The output module 12 may include a display 12-1 for displaying the image 110 and the augmented reality content 170.

The processor 13 generally controls all operations of the electronic device 10. For example, the processor 13 may execute at least one instruction stored in the memory 17 to generally control the user input module 11, output module 12, communicate module 15, and memory 17 to provide the augmented reality content 170 to a user.

For example, the processor 13 may execute an instruction stored in an image obtaining module 17a such that a camera may obtain the image 110 with respect to a real space including a target object. Descriptions overlapping those of the embodiments of the disclosure described above with reference to FIGS. 1 to 11 are omitted.

As another example, the processor 13 may execute an instruction stored in a target object identifying module 17b to identify and track the target object 130 from the image 110. Descriptions overlapping those of the embodiments of the disclosure described above with reference to FIGS. 1 to 11 are omitted.

As another example, the processor 13 may execute an instruction stored in an AR location information obtaining module 17c to identify AR location information and location information of the target object 130. In addition, the processor 13 may identify a location where the augmented reality content 170 is to be displayed on the image 110, by using the AR location information received from the server 20. Descriptions overlapping those of the embodiments of the disclosure described above with reference to FIGS. 1 to 11 are omitted.

As another example, the processor 13 may execute an instruction stored in an augmented reality content output module 17d to control the display 12-1 to display the augmented reality content 170. In addition, the processor 13 may identify the location where the augmented reality content 170 is to be displayed on the image 110, by using the AR location information received from the server 20. The processor 13 may identify the location where the augmented reality content 170 is to be displayed, by comparing the AR location information received from the server 20 with the location information of the target object 130. The processor 13 may control the display 12-1 to display the augmented reality content 170 at the identified location. Descriptions overlapping those of the embodiments of the disclosure described above with reference to FIGS. 1 to 11 are omitted.

The processor 13 may be at least one processor that is used for general purposes. In addition, the processor 13 may include at least one processor manufactured to perform a function of an AI model. The processor 13 may execute a series of instructions such that the AI model learns new training data. The processor 13 may execute a software module stored in the memory 17 to perform functions of the AI model described above with reference to FIGS. 1 to 11.

The communicate module 15 may include one or more components enabling the electronic device 10 to communicate with another device (not shown) and the server 20. The other device may be a computing device, such as the electronic device 10, but is not limited thereto.

The memory 17 may store at least one instruction and at least one program for processes and controls by the processor 13, and may store data input to or output from the electronic device 10.

The memory 17 may include at least one type of storage media from among memories transitorily storing data, such as random-access memory (RAM) and static RAM (SRAM), and data storages non-transitorily storing data, such as a flash memory type, hard disk type, multimedia card micro type, or card type memory (for example, a secure digital (SD) or an extended digital (XD) memory), read-only memory (ROM), electrically erasable programmable ROM (EEPROM), programmable ROM (PROM), a magnetic memory, a magnetic disk, and an optical disk.

Figure 13:
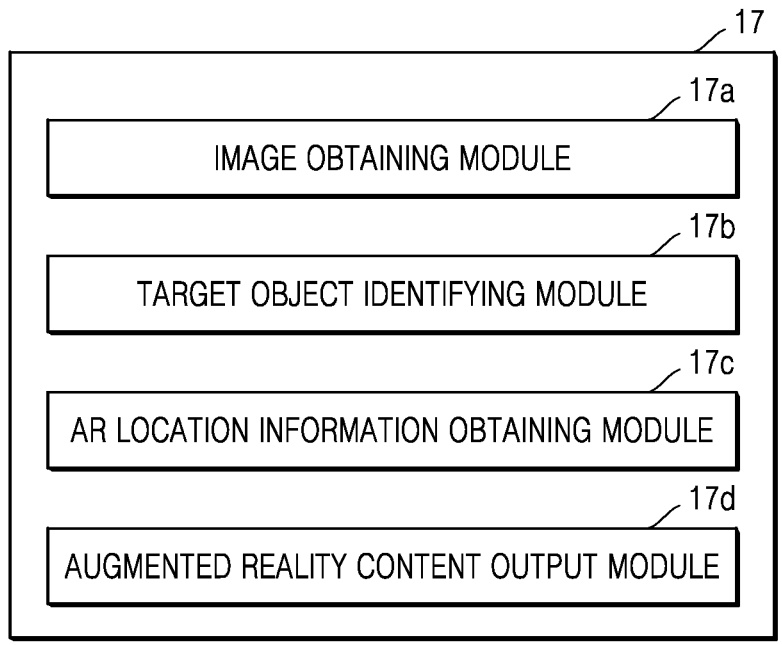
FIG. 13 is a block diagram of a software module of a memory included in an electronic device according to an embodiment of the disclosure.

FIG. 13 is a block diagram of a software module of a memory included in an electronic device according to an embodiment of the disclosure.

Referring to FIG. 13, the memory 17 may include the image obtaining module 17*a*, the target object identifying module 17*b*, the AR location information obtaining module 17*c*, and the AR location information obtaining module 17*c*, as software modules including instructions for enabling the electronic device 10 to perform the embodiments of the disclosure described above with reference to FIGS. 1 to 11. However, the electronic device 10 may provide the augmented reality content 170 to a user via more or fewer software modules than those shown in FIG. 13.

For example, the processor 13 may execute an instruction included in the image obtaining module 17*a* such that the electronic device 10 may obtain the image 110 with respect to a real space including a target object by using a camera. Descriptions overlapping those of the embodiments of the disclosure described above with reference to FIGS. 1 to 11 are omitted.

As another example, the processor 13 may execute an instruction included in the target object identifying module 17*b* such that the electronic device 10 may identify and track the target object 130 from the image 110. Descriptions overlapping those of the embodiments of the disclosure described above with reference to FIGS. 1 to 11 are omitted.

As another example, the processor 13 may execute an instruction included in the AR location information obtaining module 17*c* such that the electronic device 10 may identify AR location information and location information of the target object 130. The electronic device 10 may identify a location where the augmented reality content 170 is to be displayed on the image 110, by using the AR location information received from the server 20. Descriptions overlapping those of the embodiments of the disclosure described above with reference to FIGS. 1 to 11 are omitted.

As another example, the processor 13 may execute an instruction included in the augmented reality content output module 17*d* such that the electronic device 10 may display the augmented reality content 170. The electronic device 10 may identify the location where the augmented reality content 170 is to be displayed on the image 110, by using the AR location information received from the server 20. The electronic device 10 may identify the location where the augmented reality content 170 is to be displayed, by comparing the AR location information received from the server 20 with the location information of the target object 130. The electronic device 10 may display the augmented reality content 170 at the identified location. Descriptions overlapping those of the embodiments of the disclosure described above with reference to FIGS. 1 to 11 are omitted.

Figure 14:
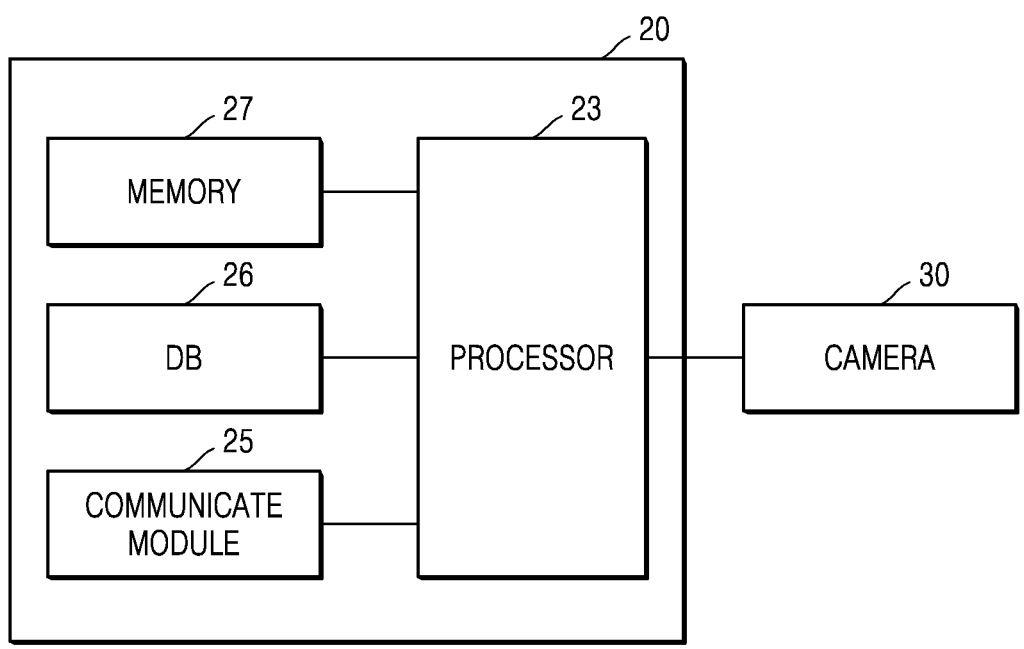
FIG. 14 is a block diagram of a server according to an embodiment of the disclosure.

FIG. 14 is a block diagram of a server according to an embodiment of the disclosure.

Referring to FIG. 14, the server 20 according to some embodiments of the disclosure may include a communicate module 25, a memory 26, the DB 27, and a processor 23.

The communicate module 25 may include one or more components enabling the server 20 to communicate with the electronic device 10.

The memory 26 may store at least one instruction and at least one program for processes and controls by the processor 23, and may store data input to or output from the server 20. The memory 26 may store an instruction and program for the processor 23 to generate augmented reality content.

The DB 27 may store data received from the electronic device 10. The DB 27 may store information for generating the augmented reality content to be transmitted to the electronic device 10. For example, the DB 27 may store information about a target object, such as pitcher information, batter information, information about an offense, information about a defender, physical information of an athlete selected by a user, stat information of an athlete, information about a game, or information about a stadium.

The processor 23 generally controls all operations of the server 20. For example, the processor 23 may execute the programs stored in the memory 26 of the server 20 to control the DB 27 and the communicate module 25 in general. In addition, the processor 23 may obtain an image from the camera 30 connected to the server 20. The processor 23 may execute the programs to perform operations of the server 20 described with reference to FIGS. 1 to 11.

For example, the processor 23 may execute an instruction stored in a virtual 3D space obtaining module 27*a* to generate the virtual 3D space 210 from data about a structure, such as a stadium, a theater, or an exhibition hall. Descriptions overlapping those of the embodiments of the disclosure described above with reference to FIGS. 1 to 11 are omitted.

As another example, the processor 23 may execute an instruction stored in an electronic device location and field of view identifying module 27*b* to match the image 110 and the virtual 3D space 210. Descriptions overlapping those of the embodiments of the disclosure described above with reference to FIGS. 1 to 11 are omitted.

As another example, the processor 23 may execute an instruction stored in a target object identifying module 27*c* to identify and track a target object included in the virtual 3D space 210. Descriptions overlapping those of the embodiments of the disclosure described above with reference to FIGS. 1 to 11 are omitted.

As another example, the processor 23 may execute an instruction stored in an augmented reality content generating module 27*d* to generate the augmented reality content 170 and transmit the same to the electronic device 10. Descriptions overlapping those of the embodiments of the disclosure described above with reference to FIGS. 1 to 11 are omitted.

Figure 15:
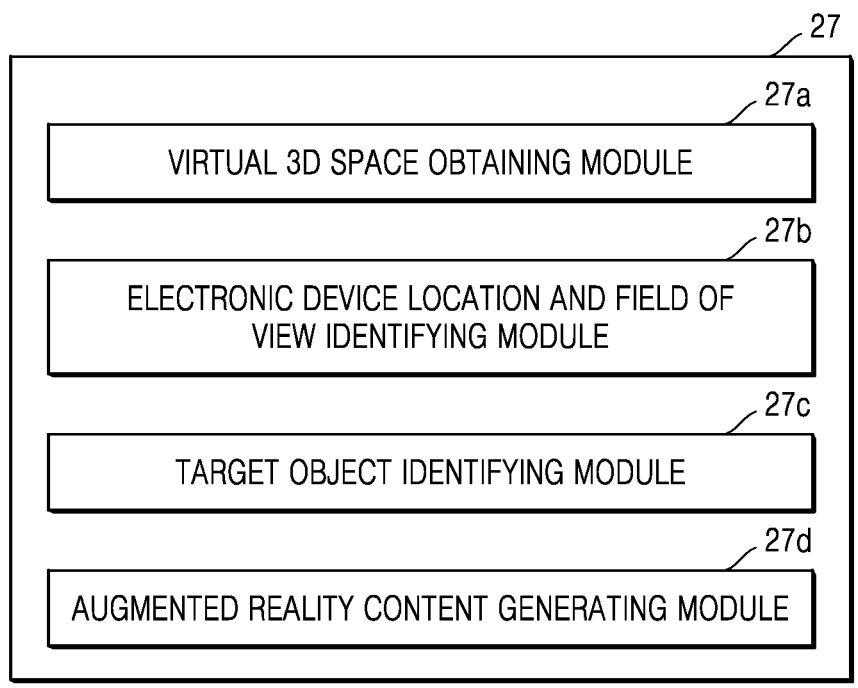
FIG. 15 is a block diagram of a software module of a memory included in a server according to an embodiment of the disclosure.

FIG. 15 is a block diagram of a software module of the memory 26 included in the server 20, according to an embodiment of the disclosure.

Referring to FIG. 15, the memory 27 may include the virtual 3D space obtaining module 27*a*, the electronic device location and field of view identifying module 27*b*, the target object identifying module 27*c*, and the augmented reality content generating module 27*d*, as software modules for the server 20 to perform the embodiments of the disclosure described above with reference to FIGS. 1 to 11. However, the server 20 may generate the augmented reality content 170 via more or fewer software modules than those shown in FIG. 15.

For example, the processor 23 may execute an instruction included in the virtual 3D space obtaining module 27*a* such that the server 20 may generate the virtual 3D space 210 from data about a structure, such as a stadium, a theater, or an exhibition hall. Descriptions overlapping those of the embodiments of the disclosure described above with reference to FIGS. 1 to 11 are omitted.

As another example, the processor 23 may execute an instruction included in the electronic device location and field of view identifying module 27*b* such that the server 20 may match the image 110 and the virtual 3D space 210. Descriptions overlapping those of the embodiments of the disclosure described above with reference to FIGS. 1 to 11 are omitted.

As another example, the processor 23 may execute an instruction included in the target object identifying module 27*c* such that the server 20 may identify and track a target object included in the virtual 3D space 210. Descriptions overlapping those of the embodiments of the disclosure described above with reference to FIGS. 1 to 11 are omitted.

As another example, the processor 23 may execute an instruction included in the augmented reality content generating module 27*d* such that the server 20 may generate the augmented reality content 170 and transmit the same to the electronic device 10. Descriptions overlapping those of the embodiments of the disclosure described above with reference to FIGS. 1 to 11 are omitted.

According to the embodiments of the disclosure of FIGS. 1 to 15, the electronic device 10 may display augmented reality content according to a location of a target object even when the target object to be displayed on the augmented reality content moves quickly or a user terminal moves quickly, thereby providing natural augmented reality content to a user.

Some embodiment of the disclosure may also be realized in a form of a recording medium including instructions executable by a computer, such as a program module executed by a computer. A computer-readable recording medium may be an arbitrary available medium accessible by a computer, and examples thereof include all volatile and non-volatile media and separable and non-separable media. Further, the computer-readable recording medium may include a computer storage medium. Examples of the computer storage medium include all volatile and non-volatile media and separable and non-separable media, which have been implemented by an arbitrary method or technology, for storing information, such as computer-readable instructions, data structures, program modules, and other data.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method operated by an electronic device, the operation method comprising:
    obtaining location information of the electronic device and field of view information of the electronic device;
    transmitting, to a server, the location information of the electronic device and the field of view information of the electronic device;
    obtaining, by using a camera, a plurality of images with respect to a target object included in a real space;
    receiving, from the server, an augmented reality content generated by the server based on the location information of the electronic device and the field of view information of the electronic device;
    detecting the target object from the plurality of images;
    identifying a moving speed and a moving direction of the target object from the plurality of images;
    measuring a delay time that occurred by transmitting the location information and the field of view information to the server and receiving the augmented reality content from the server;
    obtaining target object location information regarding a location of the target object in the plurality of images by performing a calculation using the identified moving speed of the target object and the measured delay time;
    comparing the target object location information with first augmented reality location information about a location where the augmented reality content is to be displayed on a display of the electronic device, which is received from the server;
    determining the target object location information as second augmented reality location information based on a result of the comparison, wherein the second augmented reality location information is a location of the target object identified by reflecting the delay time, based on the moving speed of the target object; and
    displaying the augmented reality content on an image subsequent to the plurality of images, based on the second augmented reality location information.

2. The method of claim 1, wherein the displaying of the augmented reality content on the subsequent image further comprises:
    identifying at least one landmark from the image;
    segmenting the subsequent image into a plurality of grids, based on the at least one landmark;
    comparing the target object location information with the first augmented reality location information, based on the plurality of grids; and
    changing the first augmented reality location information to the second augmented reality location information, based on a result of the comparing.

3. The method of claim 1,
    wherein the transmitting of the location information of the electronic device and the field of view information of the electronic device comprises:
        identifying the target object from the plurality of images, and
        transmitting, to the server, the plurality of images and information about the identified target object, and
    wherein the receiving of the augmented reality content comprises receiving the augmented reality content generated based on the information about the target object transmitted to the server.

4. The method of claim 1,
wherein the transmitting of the location information of the electronic device and the field of view information of the electronic device comprises:
 receiving a user input of selecting a type of the augmented reality content, and
 transmitting, to the server, information about the selected type of the augmented reality content, and
wherein the receiving of the augmented reality content comprises receiving the augmented reality content generated to correspond to the selected type of the augmented reality content.

5. An electronic device comprising:
a display;
a camera configured to obtain a plurality of images with respect to a target object included in a real space;
a communication interface configured to transmit and receive data with a server;
a memory storing one or more instructions; and
at least one processor configured to execute the one or more instructions to:
 obtain location information of the electronic device and field of view information of the electronic device,
 control the communication interface to transmit, to the server, the location information of the electronic device and the field of view information of the electronic device,
 control the communication interface to receive, from the server, an augmented reality content generated by the server based on the location information of the electronic device and the field of view information of the electronic device,
 detect the target object from the plurality of images and identify a moving speed and a moving direction of the target object from the images,
 measure a delay time that occurred by transmitting the location information and the field of view information to the server and receiving the augmented reality content from the server,
 obtain target object location information regarding a location of the target object in the plurality of images by performing a calculation using the identified moving speed of the target object and the measured delay time,
 compare the target object location information with first augmented reality location information about a location where the augmented reality content is to be displayed on a display of the electronic device, which is received from the server,
 determining the target object location information as second augmented reality location information based on a result of the comparison, wherein the second augmented reality location information is a location of the target object identified by reflecting a delay time, based on the moving speed of the target object, and
 control the display to display the augmented reality content on an image subsequent to the plurality of images, based on the second augmented reality location information.

6. The electronic device of claim 5, wherein the at least one processor is further configured to:
 identify at least one landmark from the plurality of images,
 segment the plurality of images into a plurality of grids, based on the at least one landmark,
 compare the target object location information with the first augmented reality location information, based on the plurality of grids, and
 change the first augmented reality location information to the second augmented reality location information, based on a result of the comparing.

7. The electronic device of claim 5, wherein the at least one processor is further configured to:
 identify the target object from the plurality of images,
 control the communication interface to transmit, to the server, the plurality of images and information about the identified target object, and
control the communication interface to receive the augmented reality content generated based on the information about the target object transmitted to the server.

8. The electronic device of claim 5, further comprising:
 a user input interface configured to receive a user input for selecting a type of the augmented reality content, and
 wherein the at least one processor is further configured to:
  control the communication interface to transmit, to the server, information about the selected type of the augmented reality content, and
  control the communication interface to receive the augmented reality content generated to correspond to the selected type of the augmented reality content.

* * * * *